(12) United States Patent
Klein, II

(10) Patent No.: US 10,983,508 B2
(45) Date of Patent: Apr. 20, 2021

(54) AUTOMATED INDEPENDENT CART SYSTEM AND METHOD OF CONTROLLING OPERATION OF A PLURALITY OF MOVERS OF THE AUTOMATED INDEPENDENT CART SYSTEM

(71) Applicant: Rockwell Automation Technologies, Inc., Mayfield Heights, OH (US)

(72) Inventor: R. W. Klein, II, Owatonna, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 25 days.

(21) Appl. No.: 16/427,494

(22) Filed: May 31, 2019

(65) Prior Publication Data

US 2020/0379439 A1 Dec. 3, 2020

(51) Int. Cl.
  *G05B 19/416* (2006.01)
(52) U.S. Cl.
  CPC .. *G05B 19/416* (2013.01); *G05B 2219/31281* (2013.01)
(58) Field of Classification Search
  CPC . B61C 3/00; B61L 23/14; B61L 25/04; G05B 19/4189; G05B 2219/41327; G05B 2219/45054; G05D 1/0088; G05D 1/0291; G05D 2201/0216
  See application file for complete search history.

(56) References Cited

U.S. PATENT DOCUMENTS

| | | | | |
|---|---|---|---|---|
| 5,964,963 A * | 10/1999 | Turchan | ................ | B01J 37/349 148/22 |
| 5,965,963 A * | 10/1999 | Chitayat | ............... | H02K 41/031 310/12.01 |
| 6,191,507 B1 * | 2/2001 | Peltier | .................... | B65G 54/02 310/12.02 |
| 2003/0230941 A1 * | 12/2003 | Jacobs | ............... | B29C 66/1122 310/12.19 |
| 2006/0107486 A1 * | 5/2006 | Andre | .................... | B08B 15/02 15/302 |
| 2018/0074478 A1 * | 3/2018 | Burkhard | ............. | G05B 19/418 |
| 2018/0086565 A1 * | 3/2018 | Grosskreuz | ........... | B65G 54/02 |

* cited by examiner

*Primary Examiner* — Kidest Bahta
(74) *Attorney, Agent, or Firm* — Boyle Fredrickson, SC

(57) ABSTRACT

A method and system for motion control of movers in an independent cart system is disclosed. In one implementation, the independent cart system includes a plurality of movers, a track including a path, and a controller coupled to the track. Each of the plurality of movers includes at least one drive magnet, and each track segment includes a plurality of drive coils and a drive coupled to the plurality of drive coils. The controller defines a queue zone for the path, the queue zone having one or more target positions; defines a circular pointer queue for the queue zone; associating the circular pointer queue with the one or more target positions of the queue zone; circulating the circular pointer queue when a lead mover leaves the queue zone; and moves the movers through the queue zone based on the circular pointer queue.

16 Claims, 19 Drawing Sheets

Table 4

| Queue Zone 1 | | |
|---|---|---|
| Zone Target | Target Position | Mover |
| 0 | X0 | M1 |
| 1 | X1 | M2 |
| 2 | X2 | M3 |
| 3 | X3 | M4 |
| 4 | X4 | M5 |
| 5 | X5 | M6 |
| Queue Zone 2 | | |
| Zone Target | Target Position | Mover |
| 0 | X0 | M4 |
| 1 | X1 | M5 |
| 2 | X2 | M6 |
| 3 | X3 | M1 |
| 4 | X4 | M2 |
| 5 | X5 | M3 |

$Q_2 : X_3$

Table 5

| Queue Zone 1 | | |
|---|---|---|
| Zone Target | Target Position | Mover |
| 0 | X0 | M1 |
| 1 | X1 | M2 |
| 2 | X2 | M3 |
| 3 | X3 | M4 |
| 4 | X4 | M5 |
| 5 | X5 | M6 |
| Queue Zone 2 | | |
| Zone Target | Target Position | Mover |
| 0 | X0 | M4 |
| 1 | X1 | M5 |
| 2 | X2 | M6 |
| 3 | X3 | M1 |
| 4 | X4 | M2 |
| 5 | X5 | M3 |

Table 6

| Queue Zone 1 | | |
|---|---|---|
| Zone Target | Target Position | Mover |
| 0 | X0 | M2 |
| 1 | X1 | M3 |
| 2 | X2 | M4 |
| 3 | X3 | M5 |
| 4 | X4 | M6 |
| 5 | X5 | M1 |
| Queue Zone 2 | | |
| Zone Target | Target Position | Mover |
| 0 | X0 | M4 |
| 1 | X1 | M5 |
| 2 | X2 | M6 |
| 3 | X3 | M1 |
| 4 | X4 | M2 |
| 5 | X5 | M3 |

Fig. 12

Table 7

Queue Zone 1

| Zone Target | Target Position | Mover |
|---|---|---|
| 0 | X0 | M1 |
| 1 | X1 | M2 |
| 2 | X2 | M3 |
| 3 | X3 | M4 |
| 4 | X4 | M5 |
| 5 | X5 | M6 |

Queue Zone 2

| Zone Target | Target Position | Mover |
|---|---|---|
| 0 | X0 | M4 |
| 1 | X1 | M5 |
| 2 | X2 | M6 |
| 3 | X99 | M1 |
| 4 | X99 | M2 |
| 5 | X99 | M3 |

Queue Zone 3

| Zone Target | Target Position | Mover |
|---|---|---|
| 0 | X0 | M3 |
| 1 | X1 | M4 |
| 2 | X2 | M5 |
| 3 | X3 | M6 |
| 4 | X4 | M1 |
| 5 | X5 | M2 |

Queue Zone 4

| Zone Target | Target Position | Mover |
|---|---|---|
| 0 | X0 | M3 |
| 1 | X1 | M4 |
| 2 | X2 | M5 |
| 3 | X2 | M6 |
| 4 | X2 | M1 |
| 5 | X2 | M2 |

Table 8

Queue Zone 1

| Zone Target | Target Position | Mover |
|---|---|---|
| 0 | X0 | M1 |
| 1 | X1 | M2 |
| 2 | X2 | M3 |
| 3 | X3 | M4 |
| 4 | X4 | M5 |
| 5 | X5 | M6 |

Queue Zone 2

| Zone Target | Target Position | Mover |
|---|---|---|
| 0 | X0 | M4 |
| 1 | X1 | M5 |
| 2 | X2 | M6 |
| 3 | X99 | M1 |
| 4 | X99 | M2 |
| 5 | X99 | M3 |

→ $Q_3:X_1$

Queue Zone 3

| Zone Target | Target Position | Mover |
|---|---|---|
| 0 | X0 | M3 |
| 1 | X1 | M4 |
| 2 | X2 | M5 |
| 3 | X3 | M6 |
| 4 | X4 | M1 |
| 5 | X5 | M2 |

Queue Zone 4

| Zone Target | Target Position | Mover |
|---|---|---|
| 0 | X0 | M3 |
| 1 | X1 | M4 |
| 2 | X2 | M5 |
| 3 | X2 | M6 |
| 4 | X2 | M1 |
| 5 | X2 | M2 |

Fig. 13A

Table 9

Queue Zone 1

| Zone Target | Target Position | Mover |
|---|---|---|
| 0 | X0 | M1 |
| 1 | X1 | M2 |
| 2 | X2 | M3 |
| 3 | X3 | M4 |
| 4 | X4 | M5 |
| 5 | X5 | M6 |

Queue Zone 2

| Zone Target | Target Position | Mover |
|---|---|---|
| 0 | X0 | M5 |
| 1 | X1 | M6 |
| 2 | X2 | M1 |
| 3 | X99 | M2 |
| 4 | X99 | M3 |
| 5 | X99 | M4 |

Queue Zone 3

| Zone Target | Target Position | Mover |
|---|---|---|
| 0 | X0 | M3 |
| 1 | X1 | M4 |
| 2 | X2 | M5 |
| 3 | X3 | M6 |
| 4 | X4 | M1 |
| 5 | X5 | M2 |

Queue Zone 4

| Zone Target | Target Position | Mover |
|---|---|---|
| 0 | X0 | M3 |
| 1 | X1 | M4 |
| 2 | X2 | M5 |
| 3 | X2 | M6 |
| 4 | X2 | M1 |
| 5 | X2 | M2 |

Table 10

Queue Zone 1   → $Q_2 : X_2$

| Zone Target | Target Position | Mover |
|---|---|---|
| 0 | X0 | M1 |
| 1 | X1 | M2 |
| 2 | X2 | M3 |
| 3 | X3 | M4 |
| 4 | X4 | M5 |
| 5 | X5 | M6 |

Queue Zone 2

| Zone Target | Target Position | Mover |
|---|---|---|
| 0 | X0 | M5 |
| 1 | X1 | M6 |
| 2 | X2 | M1 |
| 3 | X99 | M2 |
| 4 | X99 | M3 |
| 5 | X99 | M4 |

Queue Zone 3

| Zone Target | Target Position | Mover |
|---|---|---|
| 0 | X0 | M3 |
| 1 | X1 | M4 |
| 2 | X2 | M5 |
| 3 | X3 | M6 |
| 4 | X4 | M1 |
| 5 | X5 | M2 |

Queue Zone 4

| Zone Target | Target Position | Mover |
|---|---|---|
| 0 | X0 | M3 |
| 1 | X1 | M4 |
| 2 | X2 | M5 |
| 3 | X2 | M6 |
| 4 | X2 | M1 |
| 5 | X2 | M2 |

Fig. 13B

Table 11

| Queue Zone 1 | | |
|---|---|---|
| Zone Target | Target Position | Mover |
| 0 | X0 | M2 |
| 1 | X1 | M3 |
| 2 | X2 | M4 |
| 3 | X3 | M5 |
| 4 | X4 | M6 |
| 5 | X5 | M1 |
| Queue Zone 2 | | |
| Zone Target | Target Position | Mover |
| 0 | X0 | M5 |
| 1 | X1 | M6 |
| 2 | X2 | M1 |
| 3 | X99 | M2 |
| 4 | X99 | M3 |
| 5 | X99 | M4 |
| Queue Zone 3 | | |
| Zone Target | Target Position | Mover |
| 0 | X0 | M3 |
| 1 | X1 | M4 |
| 2 | X2 | M5 |
| 3 | X3 | M6 |
| 4 | X4 | M1 |
| 5 | X5 | M2 |
| Queue Zone 4 | | |
| Zone Target | Target Position | Mover |
| 0 | X0 | M3 |
| 1 | X1 | M4 |
| 2 | X2 | M5 |
| 3 | X2 | M6 |
| 4 | X2 | M1 |
| 5 | X2 | M2 |

Fig. 13C

| Table 12 | |
|---|---|
| Queue Zone 2 | |
| Mover | Circular Pointer |
| M1 | 3 |
| M2 | 4 |
| M3 | 5 |
| M4 | 0 |
| M5 | 1 |
| M6 | 2 |

| Table 13 | |
|---|---|
| Queue Zone 2 | |
| Mover | Circular Pointer |
| M1 | 2 |
| M2 | 3 |
| M3 | 4 |
| M4 | 5 |
| M5 | 0 |
| M6 | 1 |

| Table 14 | |
|---|---|
| Queue Zone 2 | |
| Mover | Circular Pointer |
| M1 | |
| M2 | |
| M3 | |
| M4 | 0 |
| M5 | 1 |
| M6 | 2 |

| Table 15 | |
|---|---|
| Queue Zone 2 | |
| Mover | Circular Pointer |
| M1 | 2 |
| M2 | |
| M3 | |
| M4 | |
| M5 | 0 |
| M6 | 1 |

| Table 16 | |
|---|---|
| Queue Zone 2 | |
| Mover | Circular Pointer |
| M1 | 99 |
| M2 | 99 |
| M3 | 99 |
| M4 | 0 |
| M5 | 1 |
| M6 | 2 |

| Table 17 | |
|---|---|
| Queue Zone 2 | |
| Mover | Circular Pointer |
| M1 | 2 |
| M2 | 99 |
| M3 | 99 |
| M4 | 99 |
| M5 | 0 |
| M6 | 1 |

| Table 18 | |
|---|---|
| Queue Zone 2 | |
| Zone Target | Circular Pointer |
| 0 | M4 |
| 1 | M5 |
| 2 | M6 |
| 3 | M1 |
| 4 | M2 |
| 5 | M3 |

| Table 19 | |
|---|---|
| Queue Zone 2 | |
| Zone Target | Circular Pointer |
| 0 | M5 |
| 1 | M6 |
| 2 | M1 |
| 3 | M2 |
| 4 | M3 |
| 5 | M4 |

Fig. 15

Table 20

| Queue Zone 1 | |
|---|---|
| Zone Target | Position (m) |
| 0 | 19.75 |
| 1 | 19.24 |
| 2 | 18.73 |
| 3 | 18.22 |
| 4 | 17.71 |
| 5 | 17.20 |

Fig. 17

AUTOMATED INDEPENDENT CART SYSTEM AND METHOD OF CONTROLLING OPERATION OF A PLURALITY OF MOVERS OF THE AUTOMATED INDEPENDENT CART SYSTEM

BACKGROUND INFORMATION

The subject matter disclosed herein relates to independent cart technology (ICT) and, more specifically, to a method and system for motion control of movers in independent cart systems.

An independent cart system (ICS) can be used in a wide variety of processes (e.g. packaging, manufacturing, and machining). ICSs can provide advantages over conventional conveyor belt systems with enhanced flexibility, extremely high-speed movement, and mechanical simplicity. Successive activation of electric coils establishes a moving electromagnetic field that interacts with magnets of a mover (also referred to as a cart) and causes the mover to travel along a track. Sensors may be spaced at fixed positions along the track and/or on the mover to provide information about the position and speed of the mover. An ICS typically includes a plurality of independently controlled movers.

In some typical systems, the track forms a closed path over which each mover repeatedly travels. At certain positions along the track, other actuators (e.g., part of a robotic system) may interact with each mover. For example, the mover or a group of movers may be stopped at a loading station at which a first actuator places a product on the mover(s). The mover(s) may then be moved along a process portion of the track where various other actuators may fill, machine, position, or otherwise interact with the product on the mover. The mover(s) may be programmed to stop at various locations or to move at a controlled speed past each of the actuators. After the various processes are performed, the mover(s) may pass or stop at an unloading station at which the product is removed from the mover. The mover(s) then completes a cycle along the closed path by returning to the loading station to receive another unit of the product. The ICS and the external actuator(s) collectively form an automated transport system.

ICSs are relatively new to the industrial market. Early adopters quickly discovered that a different motion programming solution from non-ICT applications was required for successful implementation. Initial software solutions became large and complex due to strategies that involved movers monitoring the location and movement of neighboring movers then planning motion based on this information. If delays occurred while calculating this information (e.g., due to processor performance constraints), then collisions may result. With systems containing over forty movers (i.e., over forty motion axes), processing delays using prior approaches are inevitable. The problem is increased when the primary machine controller is performing a multitude of other machine functions. The resulting motion of the movers in a particular queue zone may exhibit a "caterpillar effect." This "caterpillar effect" is when motion occurs on any cart and there's a noticeable lag on the trailing mover's initiation of motion. This "caterpillar effect" creates delays, creates motion that appears erratic, and ultimately affects machine throughput.

With high speeds (e.g., over three hundred parts per minute), accurate decision making helps manage these zones and prevent collisions. A simpler, more robust, and quickly deployable method of managing the ICS is needed. Thus, it would be desirable to provide an improved method and system for motion control of movers in ICSs.

BRIEF DESCRIPTION

In embodiments of the invention, an improved method and system for controlling movers in an automated independent cart system is disclosed. The system includes one or more queue zones having movers move in and out of the one or more queue zones. A queue zone can have a lead mover (or "leader") and one or more follow movers (or "followers"). The leader dictates the zone targets for followers in the queue. Zone targets for the followers are only updated when the leader departs the zone. Zone targets for carts in any defined zone are managed by a circular stack pointer. The pointer value is used by each cart as an indirect reference to an array of target positions in the zone. Pointer values, and consequently target positions, are only updated when an external event occurs that allows the leader in the queue zone to exit. There is no need to have additional code for each mover to monitor the location of its adjacent neighbor by the queue zone.

According to one embodiment of the invention, a method of controlling operation of a plurality of movers traveling along a path of an automated independent cart system is described. The method includes the steps of defining a queue zone for the path, the queue zone having one or more target positions, defining a circular pointer queue for the queue zone, associating the circular pointer queue with the one or more target positions of the queue zone, circulating the circular pointer queue when a lead mover leaves the queue zone, and moving the movers through the queue zone based on the circular pointer queue.

According to another embodiment of the invention, a method of controlling operation of a plurality of movers traveling along a path of an automated independent cart system is disclosed. The method includes the steps of receiving a status flag at a system controller for the automated independent cart system corresponding to desired motion of a lead mover located within a first queue zone along the path; determining whether one of the first queue zone and a second queue zone has a vacant space for the lead mover; responsive to receiving the status flag and when the vacant space for the lead mover is present, reading an absolute position for the vacant position as a function of a circular pointer for the corresponding queue zone in which the vacant position is located; generating a move command with the system controller for the lead mover to travel along the path to the vacant position; when the lead mover exits the first queue zone, updating a target position for each additional mover located within the first queue zone; and generating an additional mover command with the system controller for each additional mover located within the first queue zone to move to the updated target position.

Also disclosed according to embodiments of the invention is an automated independent cart system. The system includes a mover including at least one drive magnet; a track including a plurality of track segments, each track segment of the plurality of track segments having, respectively, a plurality of drive coils and a drive coupled to the plurality of drive coils; and a controller coupled to the track. The controller includes a non-transitory storage medium configured to store a plurality of instructions and a processor in communication with the non-transitory storage medium. The processor is operative to execute the plurality of instruction to perform the methods of the invention.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings, in which:

FIG. 12 are tables representing snapshot movement of the six movers for the cart system of FIG. 9.

FIGS. 13A-C are tables representing snapshot movement of the six movers for the cart system of FIG. 10.

FIG. 15 are tables representing snapshots of various circular pointer for a queue target pointer manager for queue zone $Q_2$ of FIG. 10;

FIG. 17 is a table representing target positions of the six zone targets for the cart system of FIG. 8.

Figure 1:
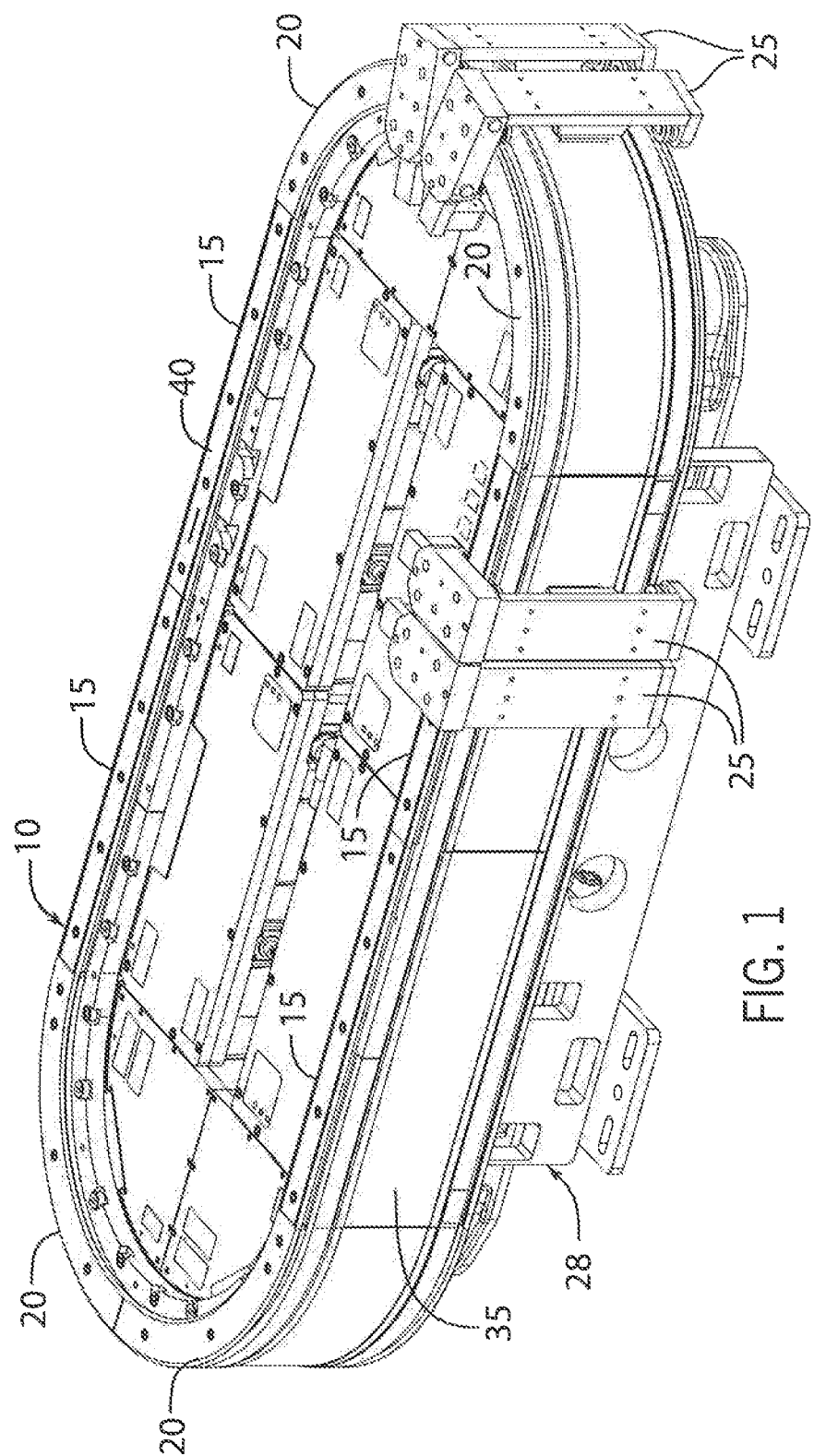
FIG. 1 is an isometric view of an exemplary automated independent cart system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning first to FIG. 1, an exemplary automated cart system for moving articles or products includes a track 10 having multiple track segments 15, 20. According to the illustrated embodiment, the track segments 15, 20 (also referred to as "segments") define a closed loop supporting movers 25 (also referred to as "carts") movable along the track 10. The track 10 is oriented in a horizontal plane and supported above the ground by a base 28 extending vertically downward from the track 10. The illustrated track 10 includes four straight segments 15, with two straight segments 15 located along each side of the track and spaced apart from the other pair. The track 10 also includes four curved segments 20 where two curved segments 20 are located at each end of the track 10 to connect the pairs of straight segments 15. The four straight segments 15 and the four curved segments 20 form an oval track and define a closed surface over which each of the movers 25 may travel. It should be understood to one skilled in the a that track segments of various sizes, lengths, and shapes may be connected together to form a track 10 and the track may include multiple branches or open-ended segments without deviating from the scope of the invention.

For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It should be understood that the track may be installed in different orientations, such as sloped or vertical, and include different shaped segments including, but not limited to, straight segments, inward bends, outward bends, up slopes, down slopes, and various combinations thereof. Further, each track segment 15, 20 is shown in a generally horizontal orientation. The track segments 15, 20 may also be oriented in a generally vertical orientation and the width of the track 10 may be greater in either the horizontal or vertical direction according to application requirements. The movers 25 will travel along the track and take various orientations according to the configuration of the track 10 and the relationships discussed herein. For example, the exemplary construction shown has a transverse drive structure; other structures are possible including a planar drive structure.

Figure 2:
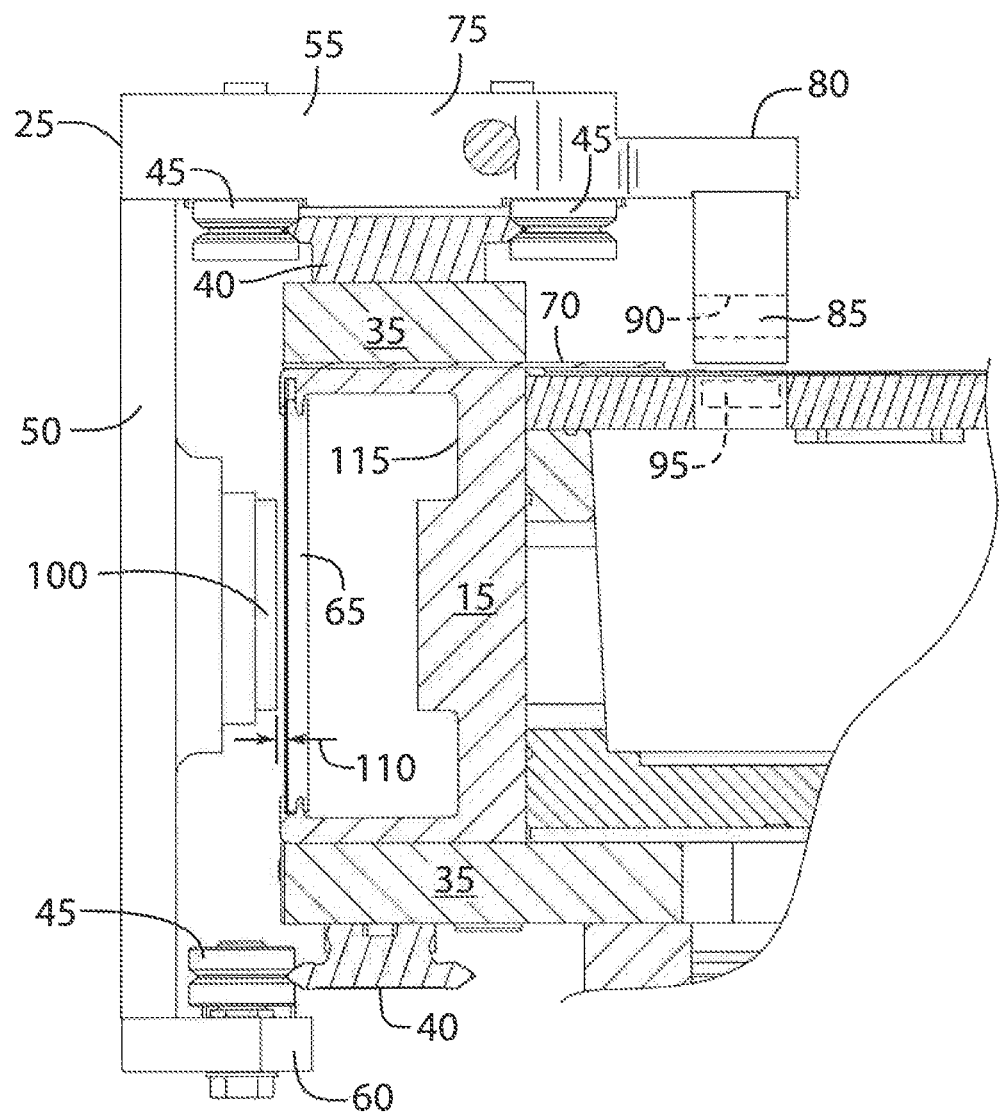
FIG. 2 is a partial sectional view of the cart system of FIG. 1.

With reference also to FIG. 2, each track segment 15, 20 includes a number of independently attached rails on which each mover 25 runs. According to the illustrated embodiment, rails extend generally along the outer periphery of the track segment 15. Each track segment 15 includes a base portion 35 (multiple base portions 35 are shown in this construction), a channel portion 115, and a rail portion 40 (multiple rail portions 40 are shown in this construction). Each mover 25 includes complementary rollers 45 to engage the rail portions 40 for movement along the track 10.

Figure 3:
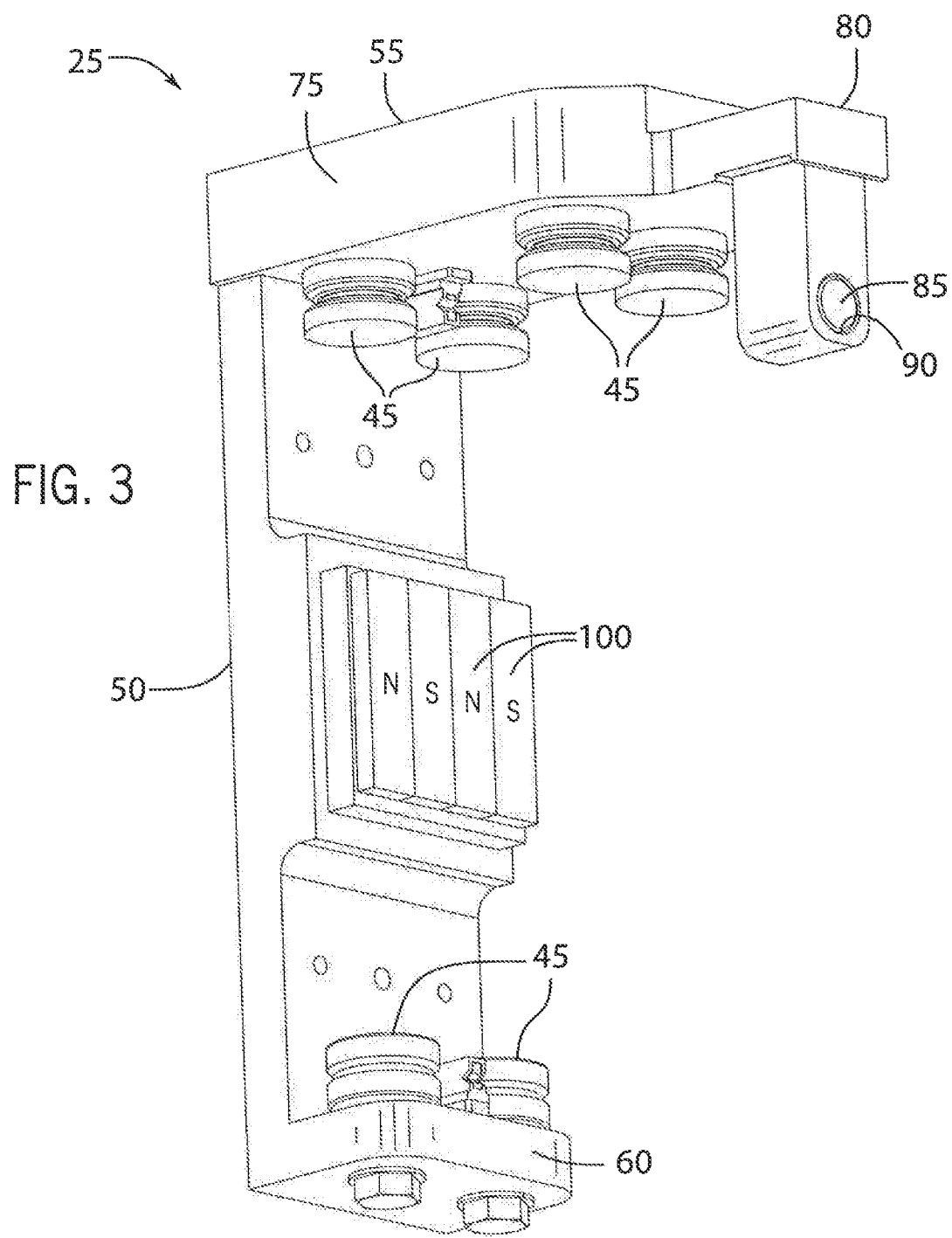
FIG. 3 is an isometric view of a mover from the cart system of FIG. 1.

With reference next to FIGS. 2 and 3, an exemplary mover 25 is illustrated. Each mover 25 includes a side member 50, a top member 55, and a bottom member 60. The side member 50 is oriented parallel to a side surface 65 when the mover 25 is mounted to the track 10. The top member 55 extends orthogonal to the side member 50 at a top end of the side member 50. The top member 55 includes a first segment 75, extending orthogonally from the side member 50. The top member 55 includes a set of rollers 45 that are mounted on the lower side of the first segment 75 and are configured to engage the rail portion 40 mounted to the top surface of the track segment 15. The bottom member 60 extends orthogonal to the side member 50 at a bottom end of the side member 50 and extends for a distance sufficient to receive a third pair of rollers 45 along the bottom of the mover 25. The third pair of rollers 45 engage an outer edge of the rail portion 40 mounted to the lower surface of the track segment 15. Thus, the mover 25 rides along the rails on the rollers 45 mounted to both the top member 55 and the bottom member 60 of each mover 25. The top member 55 also includes a second segment 80 which protrudes from the first segment 75 an additional distance beyond the rail portion 40 and is configured to hold a position magnet 85. According to the illustrated embodiment, the position magnet 85 is mounted within a recess 90 on the second portion 75 and is configured to align with a sensor 95 mounted within the track segment 15.

Figure 4:
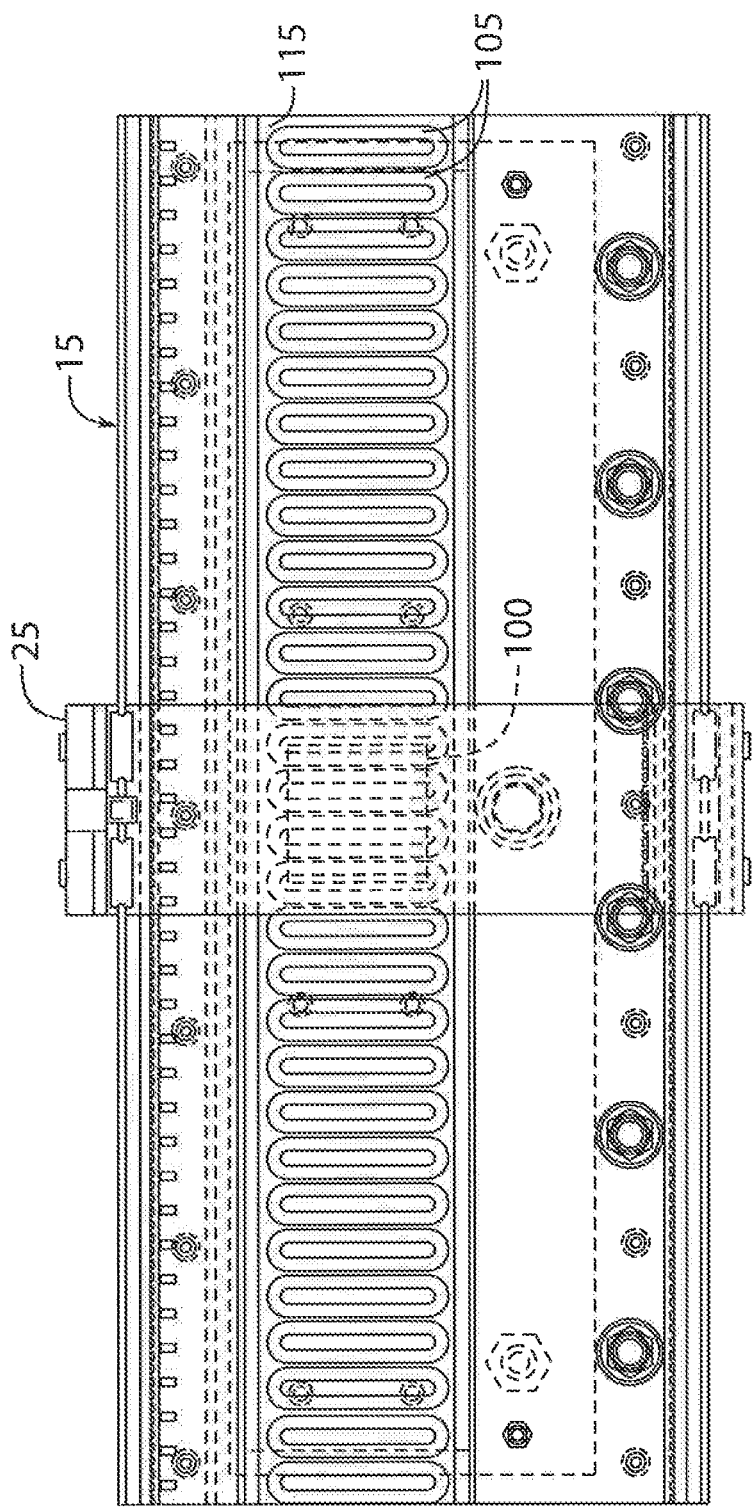
FIG. 4 is a partial side elevation view of one segment of one construction of the cart system of FIG. 1 illustrating activation coils distributed along one surface of the track segment.

A linear drive system is incorporated in part on each mover 25 and in part within each track segment 15, 20 to control motion of each mover 25 along the segment. According to the construction shown in FIG. 4, the linear drive system includes drive magnets 100 mounted to the side member 50. The drive magnets 100 are arranged in a block along an inner surface of the side member 50 with separate magnet segments alternately having a north pole, N, and south pole, S, facing the track segment 15. The drive magnets 100 are typically permanent magnets, and two adjacent magnet segments including a north pole and a south pole may be considered a pole-pair. The drive magnets 100 are mounted on the inner surface of the side member 50 and when mounted to the track 10 are spaced apart from a series of coils 105 extending along the track 10. As shown in FIG. 2, an air gap 110 is provided between each set of drive magnets 100 and the coils 105 along the track 10. On the track 10, the linear drive system includes a series of parallel coils 105 spaced along each track segment 15 as shown in FIG. 4. According to the illustrated embodiment, each coil 105 is placed in a channel 115 extending longitudinally along one surface of the track segment 15. The electromagnetic field generated by each coil 105 spans the air gap 110 and interacts with the drive magnets 100 mounted to the mover 25 to control movement of the mover 25.

Figure 5:
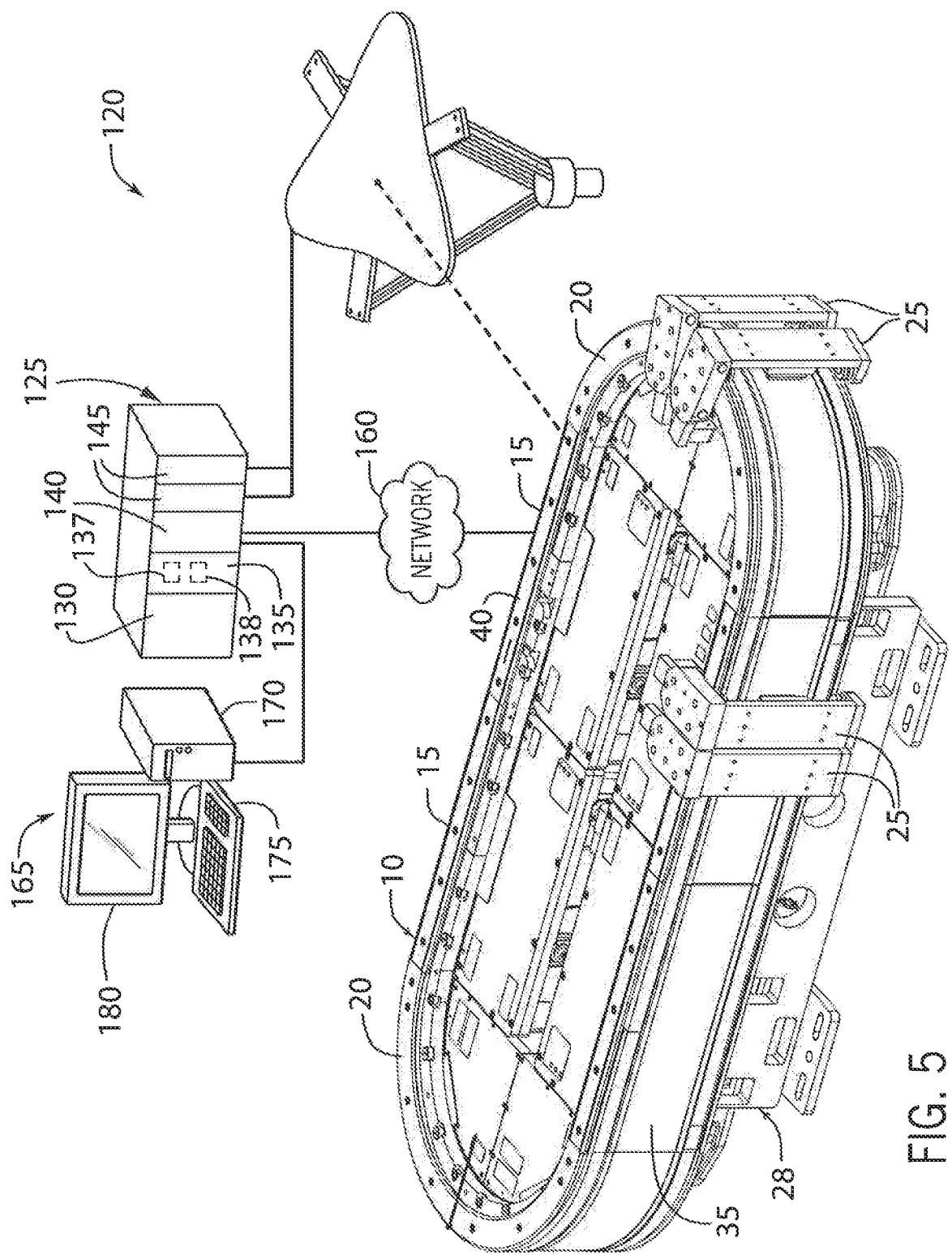
FIG. 5 is a partial isometric view/partial block diagram of an exemplary application environment incorporating the automated independent cart system of FIG. 1 with an external robot operative to engage the transport system.

Turning next to FIG. 5, an exemplary application with a robot (or actuator) 120 which is operative to interact with the movers 25 as they travel along the track 10 is illustrated. A system controller 125, which may also include a motion controller, controls interaction between the actuator 120 and movers 25 travelling along the track 10. The system controller 125 may be an industrial controller, referred to as a Programmable Logic Controller (PLC) or as a Programmable Automation Controller (PAC). The system controller 125 may include a power supply 130, a processor module 135, a communication module 140, and input and/or output (I/O) modules 145. It is contemplated that the system controller 125 may include a single rack or multiple racks of modules. Further, various additional modules may be included according to an application's requirements. A backplane extends between modules within a rack and backplane connectors on each module connect a module to the backplane to receive power and/or for communication between modules. The processor module includes a processor 137 and a memory 138. It is contemplated that the processor and memory may each be a single electronic device or formed from multiple devices. The processor 137 may be a microprocessor, and the memory 138 may be a non-transitory storage medium. Optionally, the processor 137 and/or the memory 138 may be integrated on a field programmable array (FPGA) or an application specific integrated circuit (ASIC). The memory 138 may include volatile memory, non-volatile memory, or a combination thereof.

The communication (or network) module 140 facilitates connections to devices, remote racks, and/or other controllers located remotely from the system controller 125. Network medium connect the network module, for example, via an Ethernet connection to a network 160. The connection to the network 160 may be made directly or via a network device, such as a router, a switch, and the like. The network 160 may be an intranet, the Internet, or a combination thereof. The network 160 may be an industrial network such as EtherCAT, Profinet, DeviceNet, Ethernet I/P, ControlNet, and the like, and may connect the network module 140 to other devices in the application. The network module 140 is also connected to a user interface 165, which may or may not be via the network 160.

For the construction shown, a set of I/O modules 145 connects the system controller 125 and the robot 120. Each of the I/O modules 145 may connect or disconnect from the backplane through a releasable electrical connector and may provide for one or more releasable terminals such as screw terminals or other electrical connectors allowing interconnection of the I/O modules 145 to conductors communicating with the robot 120.

The user interface 165 is provided for an operator to configure the system controller 125 and to load or configure desired motion profiles for the movers 25 and the robot 120. The motion profiles can include configuration information for the track segments 15, 20, logical axes (e.g., gains, limits, etc.) for the movers 25, configuration information for queue zones, etc. The user interface 165 may include a processing unit 170, an input device 175, including, but not limited to, a keyboard, touchpad, mouse, trackball, or touch screen, and an output device 180, such as a display. It is contemplated that each component of the user interface 165 may be incorporated into a single unit, such as an industrial computer, a desktop or laptop computer, or a tablet computer. It is contemplated that other combinations of computing devices and peripherals as would be understood in the art may be utilized or incorporated into the system controller 125 and user interface 165 without deviating from the scope of the invention.

Figure 6:
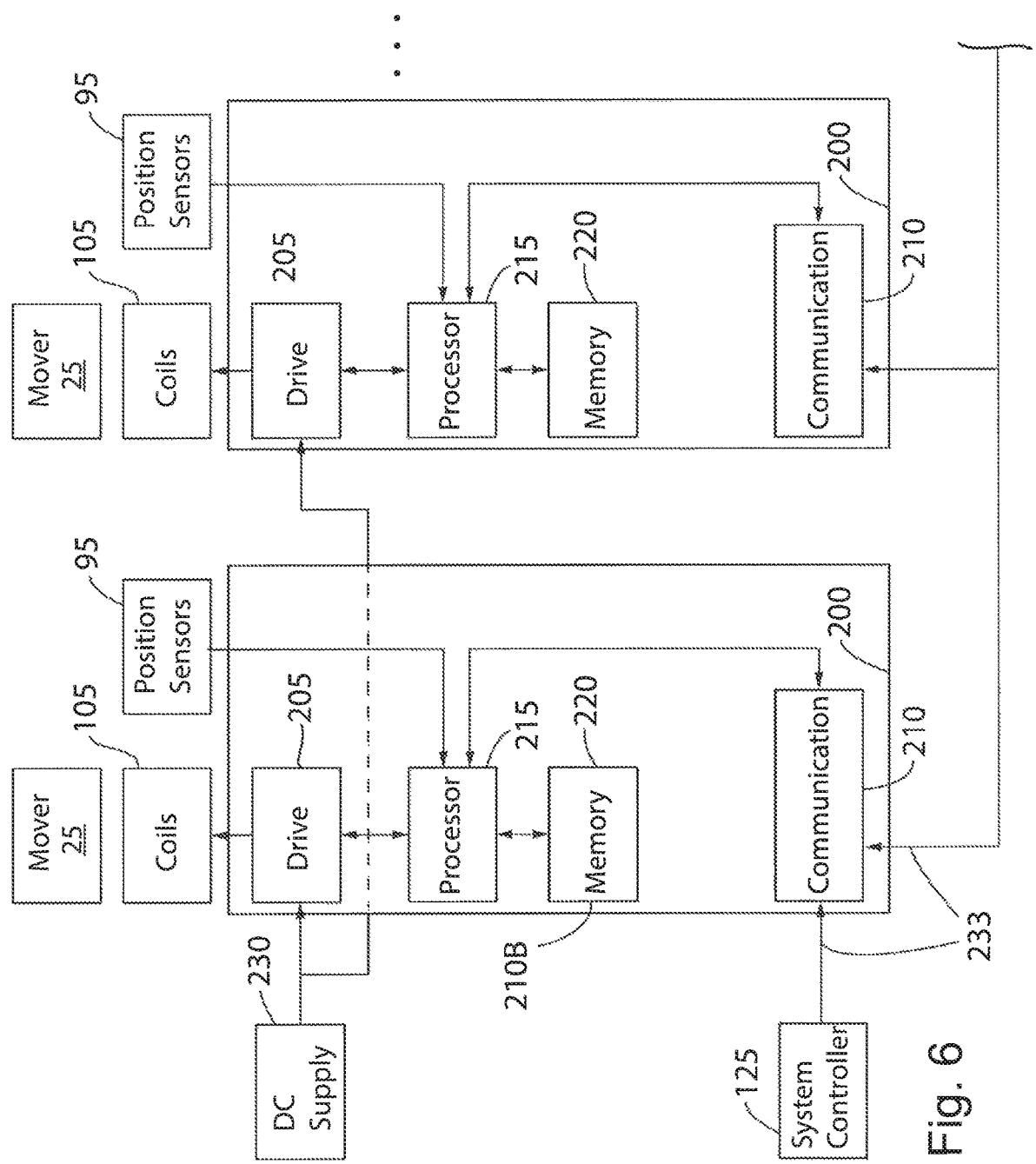
FIG. 6 is a block diagram representation of an exemplary power and control system for the cart system FIG. 1.

Turning next to FIG. 6, an exemplary power and control system for the track 10 and linear drive system is illustrated. A respective segment controller 200 is mounted within each track segment 15, 20. The segment controller 200 generates switching signals for the drive 205 which, in turn, control activation of each coil 105. Activation of the coils 105 control and position each of the movers 25 along the track segment 15, 20 according to command signals originating from the system controller 125, as is known in the art. The command signals are provided to one or more defined segment controllers for one or more movers 25. The switching signals for the drive are based on the command signals.

Communication circuitry (or module) 210 in each segment controller 200 receives communication from the system controller 125 or other segment controllers 200 and passes the communication to a processor 215 and memory 220 executing in the segment controller 200. The communication module 210 allow for connection to each other for all segments and is connected to the system controller 125. The connections provide for a network 233 or plane.

The processor 215 may be a microprocessor, and the memory 220 may be a non-transitory storage medium. Optionally, the processor 215 and/or the memory 220 within the segment controller 200 may be integrated on a field programmable array (FPGA) or an application specific integrated circuit (ASIC). It is contemplated that the processor 215 and memory 220 may each be a single electronic device or formed from multiple devices. The memory 220 may include volatile memory, non-volatile memory, or a combination thereof.

Referring again to FIG. 6, each segment controller 200 generates switching signals to control operation of switching devices within respective drives 205 mounted within the track segment 15, 20. The drive 205 within each track segment 15, 20 is connected between a DC supply 230 and the coils 105. The switching signals are generated to sequentially energize coils 205 along a track segment, where the energized coils 105 create an electromagnetic field that interacts with the drive magnets 100 on a mover 25 to control motion of the movers 25 along the corresponding track segment 15, 20. The switching signals control operation of switching devices in connection with the drive coils 105. The switching devices of the drive 205 may be solid-state devices that are activated by the switching signals, including, but not limited to, transistors, such as insulated-gate bipolar transistors (IGBTs) or metal-oxide semiconductor field-effect transistors (MOSFETs), thyristors, or silicon-controlled rectifiers.

The processor 215 also receives a feedback signal from the position sensors 95 along the track segments 15, 20 to provide an indication of the presence of one or more movers 25. While the position sensors 95 are shown as a single block, it is contemplated that the position sensors 95 typically includes multiple sensors and related conditioning circuitry. In each track segment 15, 20, the processor 215 can generate the switching signals to control the drive 205 to provide power to respective coils 105 for propelling a mover 25 while continuously receiving feedback signals for determining positions of the mover 25. The processor 215 also receives feedback signals from voltage and/or current sensors mounted at an input or output of the track segment 15, 20 providing an indication of the current operating conditions of a DC bus within the track segment 15, 20 or the operating conditions of a coil 50 connected to the track segment 15, 20.

During operation of the automated system, the system controller 125 provides coordinated motion for the system and is operative to generate motion commands for both the movers 25 along the track 10 and an external device, such as the illustrated robot 120. It is contemplated that the coordinated motion may be, for example, instruction(s) in a control program executing on the system controller 125. For example, the coordinated motion may be instructions in the control program configured to generate motion of a mover 25 and the robot 120 in tandem with each other.

Figure 7:
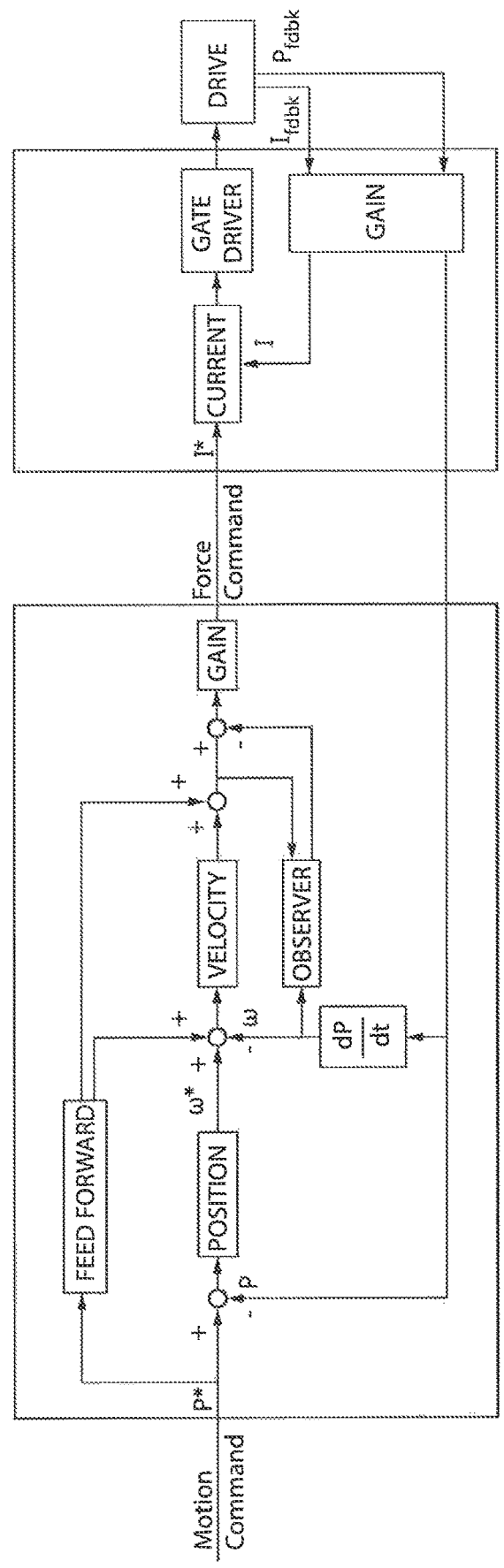
FIG. 7 is a block diagram representation illustrating the partitioning of motion and force control and the allocation of those functions to segment controllers.

An exemplary control technique for moving a mover 25 is shown in reference to FIG. 7. FIG. 7 schematically shows the input to the control technique as being a position reference signal (P*), which is determined by the system controller 125 as discussed further below. The control technique includes a number of control loops, or regulators. Each control loop, or regulator, may include one or more controller gains and control paths, and is configured to provide a desired output according to a reference input. According to the implementation illustrated, the control technique includes a position control loop, and a velocity control loop. The control loops are shown as cascading control loops where an output of one control loop is provided as an input to another control loop. The track segment also includes a feedforward path and a load observer. It is contemplated that various other control topologies may be utilized by the control technique. The output of cascading loops is a force command for a mover 25.

Force control includes applying the force command to a mover 25 by determining and applying the necessary current in the appropriate coil(s) 105 that affects force production for that mover 25. FIG. 7 shows the force command being translated to a current reference signal (I*) provided to a current regulator. The current regulator uses the current reference signal (I*) and a current feedback signal ($I_{fdbk}$), generated by a current sensor to regulate a current regulator output signal to a desired value. In one implementation, the current regulator output signal is a voltage reference signal for the gate driver which, in turn, generates the switching signals to the drive section 205. The position feedback device generates the position feedback signal ($P_{fdbk}$) used by the control technique.

Accordingly, FIG. 7 provides a simple example of a position or motion command that then provides a force command for controlling the drive. Given that the ICS has many movers/carts moving concurrently and may be part of a larger motion system, the actual generating of the position commands and force commands may be more complex than is shown. The techniques used to generate the position and force commands can vary depending on the design of the ICS.

Figure 8:
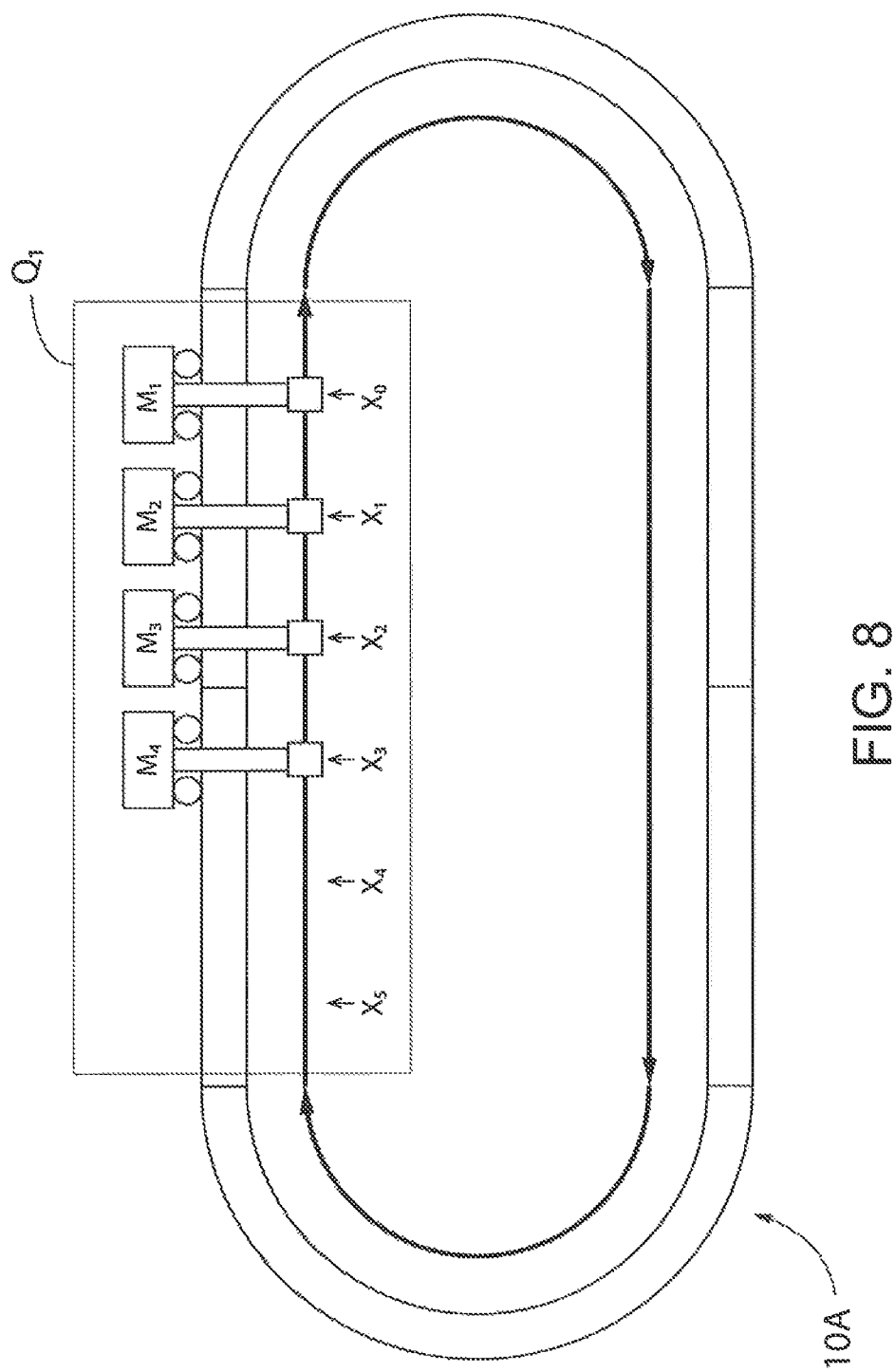
FIG. 8 is a schematic representation of the cart system of FIG. 1 having one queue zone and four movers.
Figure 9:
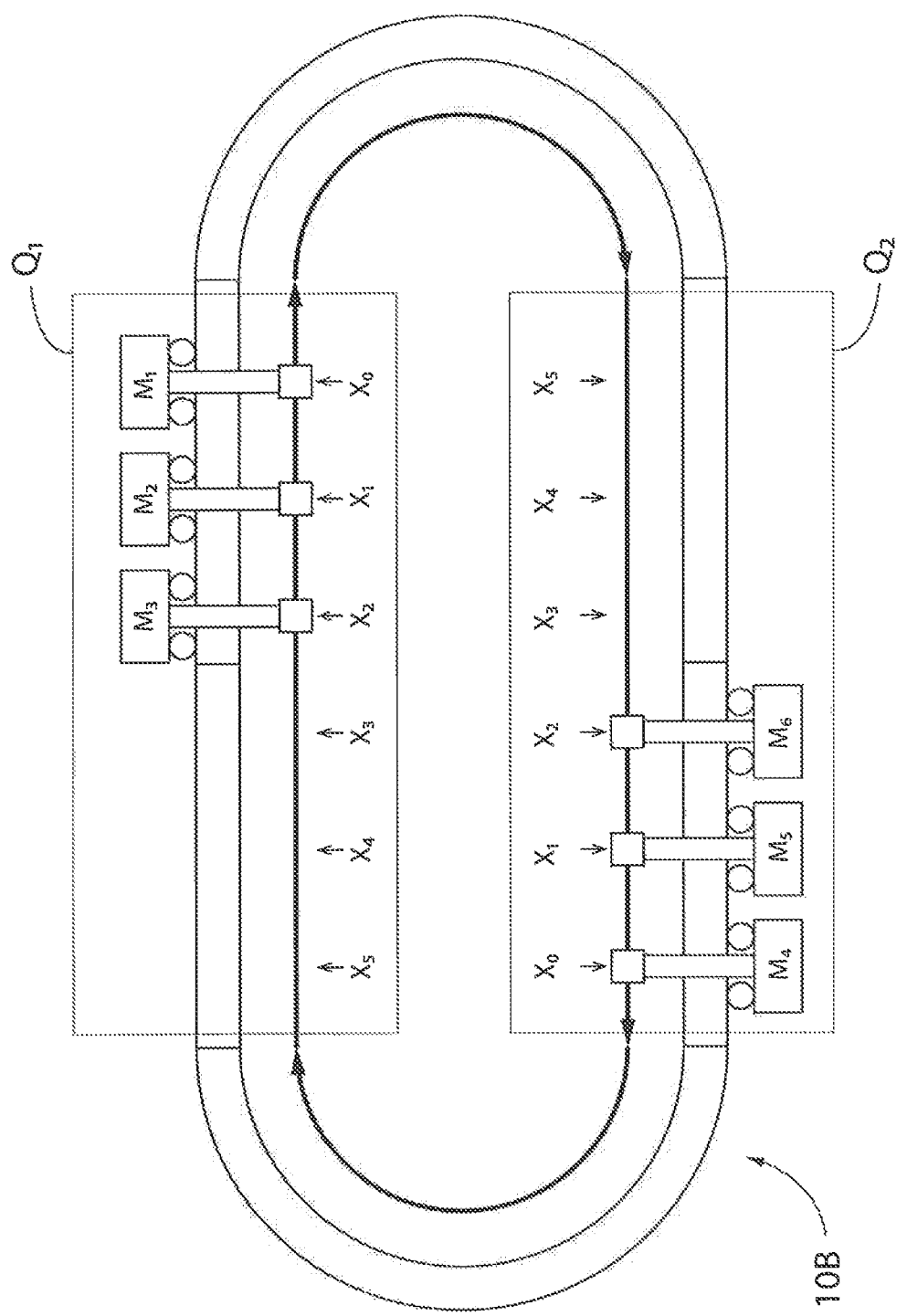
FIG. 9 is a schematic representation of the cart system of FIG. 1 having two queue zones and six movers.
Figure 10:
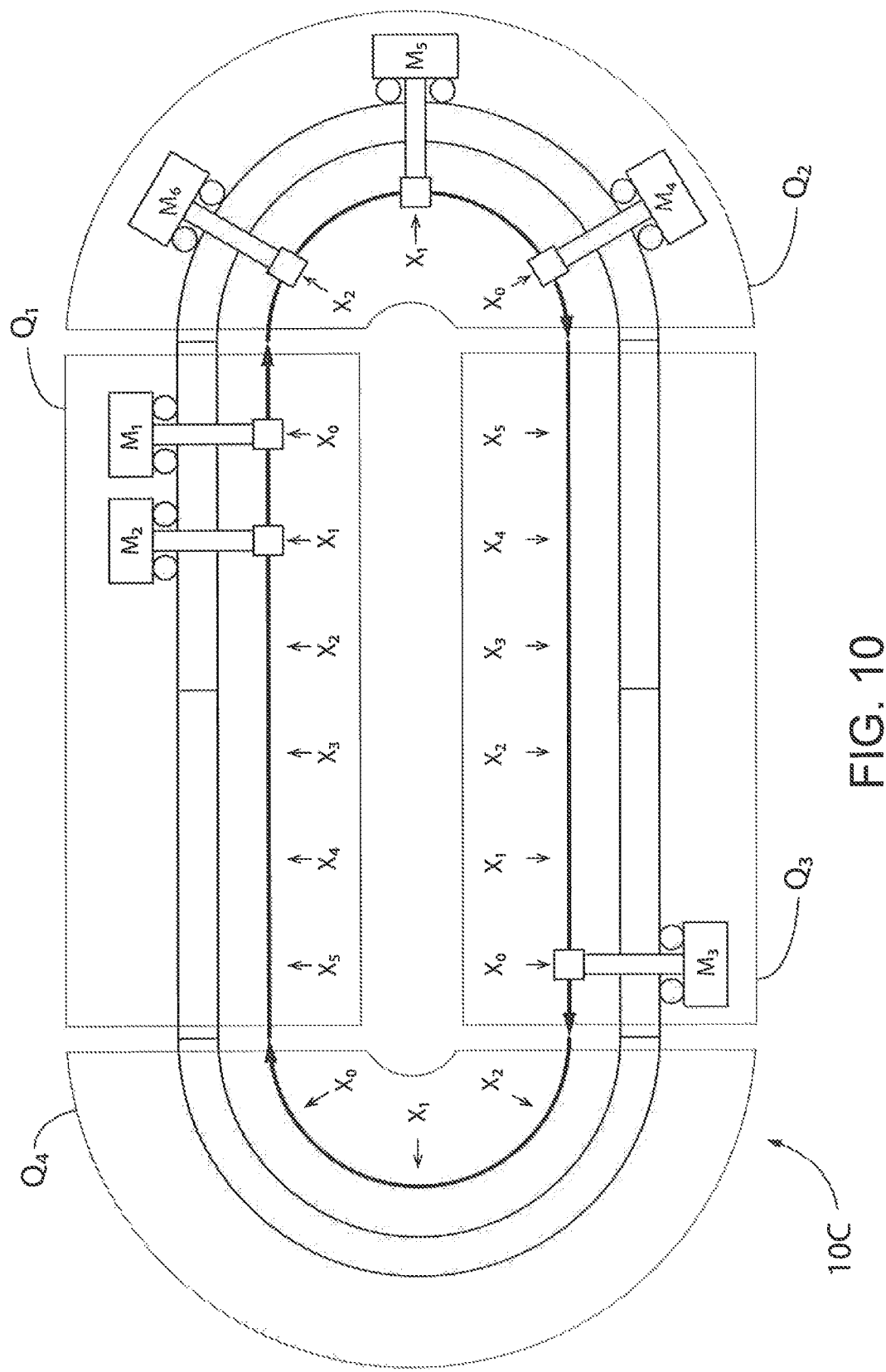
FIG. 10 is a schematic representation of the cart system of FIG. 1 having four queue zones and six movers.

In operation, the track 10 is defined as having one or more queue zones $Q_1$ to $Q_N$. FIGS. 8-10 show three examples of the one or more queue zones $Q_1$ to $Q_N$. FIG. 8 shows a track 10A with one queue zone $Q_1$; FIG. 9 shows a track 10B with two queue zones $Q_1$ and $Q_2$; and FIG. 10 shows a track 10C with four queue zones $Q_1$, $Q_2$, $Q_3$, and $Q_4$. The number of queue zones for a track can vary and be represented by the number N, where N is greater than zero. Also, the track 10 shown in FIGS. 8-10 is a closed loop oval. The arrangement of the track 10, as previously discussed, including the shape and design of the track and the number and lengths of the queue zones can vary.

Each queue zone has a defined number of target positions $X_0$ to $X_{M-1}$. The number of target positions for a queue zone can vary and be represented by the number M, where M is greater than zero. In general, a target position is a defined absolute position on the track that a mover is going towards. Once at that target, the mover is also at the position. Accordingly, the terms target position and position (or current position) may or may not be used interchangeably depending on the use. FIG. 8 shows a zone with six target positions, labelled $X_0$ to $X_5$. Each target position has a defined position. The mover in position $X_0$ is the lead mover (or leader), and the other movers in the queue that are not in position $X_0$ are the follow movers (or followers). A position on the track can be with respect to a defined location of the track. For example, in some implementations, the defined location can be defined with respect to a master axis and the movers can be defined as mover axes. The master axis may, for example, define positions from a zero position at one location on the track to incrementally greater positions along the length of the track until the track returns to the zero position. The master axis may also define a maximum velocity, acceleration, and/or deceleration for movers travelling along the track.

With reference, for example, to Table 20 in FIG. 17, the system controller may store a data table defining positions within the queue zone. As indicated, FIG. 8 illustrates a single zone with six target positions. For the example, it is assumed that each mover 25 is one-half meter (0.5 m) in length and that a desired spacing of ten centimeters (10 cm) between movers is to be maintained. Further, the initial position within the queue zone corresponds to what has been defined as the end of the track. In other words, when a mover exits the queue zone, it starts at the position defined as zero and begins to travel a cycle around the track. The track is assumed to have a length of twenty meters (20 m). The positions, therefore, defined in Table 20 correspond to an end position of the track and are defined with respect to a central axis of the mover. In other words, one-quarter of a meter (0.25 m) of the mover extends in front of the target position and one-quarter of a meter (0.25 m) of the mover extends to the rear of the target position. Each target position behind the front of the zone increments by the length of the mover plus the desired spacing in front of the mover to arrive at the next target position. As a mover receives a mover command it utilizes the value within the circular pointer to access the data table. For example, if the circular pointer indicates a mover is to move to zone target 1, it reads the position from the table for zone target 1 and uses this position to generate a move command. In other tables and examples, each position is represented by the character X.

Each ICS has a defined number of movers $M_1$ to $M_P$. The number of movers 25 for an ICS can vary and be represented by the number P, where P is greater than zero. The movers $M_1$ to $M_P$ move on the track 10, and move in and move out of the queue zones $Q_1$ to $Q_N$. FIG. 8 shows a zone with four movers, labelled $M_1$ to $M_4$. Each mover $M_1$ to $M_4$ has a current position and has a target position. A mover's current position can be the same as the mover's target position if the mover is at the mover's target position. A mover's current position can be different than the mover's target position if the mover is moving towards the mover's target position.

With reference to FIG. 9, the track 10B has two queue zones $Q_1$ and $Q_2$, respectively. Each queue zone $Q_1$ and $Q_2$ has six target positions, shown as $Q_1:X_0$ to $Q_1:X_5$ and $Q_2:X_0$ to $Q_2:X_5$, respectively. While the number of target positions for both zones is six for FIG. 9, the number can vary and be different among the two zones. Each queue zone $Q_1$ and $Q_2$ has a lead position, i.e., $Q_1:X_0$ and $Q_2:X_0$, respectively, and a mover located at the lead position is a leader for the respective queue $Q_1$ or $Q_2$. FIG. 9 shows an ICS with six movers, labelled $M_1$ to $M_6$. Movers $M_1$ and $M_4$ are the leaders.

With reference to FIG. 10, the track 10C has four queue zones $Q_1$, $Q_2$, $Q_3$, and $Q_4$, respectively. The first and third queues zones $Q_1$ and $Q_3$ have six target positions, shown as $Q_1:X_0$ to $Q_1:X_5$ and $Q_3:X_0$ to $Q_3:X_5$, respectively. The second and fourth queues zones $Q_2$ and $Q_4$ have three target positions, shown as $Q_2:X_0$ to $Q_2:X_2$ and $Q_4:X_0$ to $Q_4:X_2$, respectively. Again, the number of target positions in a particular queue zone can be different from the example herein. Each queue zone $Q_1$ to $Q_4$ has a lead position, i.e., $Q_1:X_0$, $Q_2:X_0$, $Q_3:X_0$, and $Q_4:X_0$, respectively, and a mover located at the lead position is a leader for the queue. FIG. 10 shows an ICS with six movers, labelled $M_1$ to $M_6$.

Figure 11:
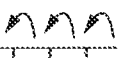
FIG. 11 are tables representing snapshot movements of the four movers for the cart system of FIG. 8.

Referring again to FIG. 8, operation of the movers $M_1$ to $M_4$ in queue zone $Q_1$ will now be discussed. Each mover $M_1$ to $M_4$ has a current position on the track 10A. With the snapshot shown in FIG. 8, mover $M_1$ is at position $X_0$, mover $M_2$ is at position $X_1$, mover $M_3$ is at position $X_2$, and mover $M_3$ is at position $X_0$. Table 1 in FIG. 11 represents this configuration. Mover $M_1$ is the leader and movers $M_2$-$M_4$ are followers for the snapshot in FIG. 8. An action can occur while a mover is at position $X_0$. For example, the robot 120 (shown in FIG. 5) may perform an action on mover $M_1$ while it is at position $X_0$. It is also contemplated that the action may be a delay, i.e., mover $M_1$ waits at position $X_0$ for a time period. Upon completion of the action, the system controller 125 may command the leader ($M_1$ in this example) to leave the queue zone $Q_1$. This would be done by having the leader $M_1$ go towards a new position, for example position $X_4$ in FIG. 8. Upon the leader, M1, leaving the queue zone, the followers in the queue zone are all targeted one target position forward. Table 2 in FIG. 11 represents this movement. Similarly, M1 which may be initially directed towards position $X_4$, would similarly be targeted one position forward, i.e., target position $X_3$. The result of these movements is represented by Table 3 in FIG. 11. Now, mover M2 is the leader of the queue zone $Q_1$, and M3, M4, and M1 are followers. The process repeat itself and the movers move in a circular pattern in the queue zone $Q_1$. Since each cart knows it position, and nothing happens until the lead cart leaves the queue, resulting in the circular movement of the queue, the positioning of the carts does not result in collisions, and existing moving control techniques can be used.

The representation in FIG. 9 will now be discussed as an example. Each mover 25 has a defined location within each of the queue zones. As seen in Table 4, each mover is assigned to one of the locations in each queue zone. While a mover 25 cannot occupy two different locations, each mover receives a command from the system controller 125, which manages motion commands for each mover, to move to one of the queue zones and to the corresponding target position to which it is assigned within the corresponding queue zone. As each leader moves out of a queue zone, the target positions for each mover are updated within the queue zone. The result is that a leader exiting one queue zone is assigned the first available target position within the next queue zone to which it will move. Thus, when the lead mover in one queue zone receives a command from the system controller 125 to exit the queue zone in which it is located and move to the next queue zone, the target position to which it is commanded to move is vacant and at the end of the existing queue of movers located in the next queue zone.

Starting out, mover $M_1$ is at position $Q_1:X_0$, mover $M_2$ is at position $Q_1:X_1$, mover $M_3$ is at position $Q_1:X_2$, mover $M_4$ is at position $Q_2:X_0$, mover $M_5$ is at position $Q_2:X_1$, and mover $M_6$ is at position $Q_2:X_2$. Table 4 in FIG. 12 represents this configuration. The use of bold in FIG. 12 represents the physical location of a mover. Mover $M_1$ is the leader of queue zone $Q_1$ and movers $M_2$ and $M_3$ are the followers in queue zone $Q_1$. Mover $M_4$ is the leader of queue zone $Q_2$ and movers $M_5$ and $M_6$ are the followers in queue zone $Q_2$. An action can occur while a mover is at position $Q_1X_0$ or $Q_2X_0$. Upon completion of the action, the system controller 125 may command the leader to leave the respective queue. This would be done by having the leader go towards a new position. For example, leader $M_1$ may leave the queue zone $Q_1$ and move towards $Q_2,X_3$, as it is assigned in the next queue. The followers in queue zone $Q_1$ each have their corresponding target position within queue zone $Q_1$ incremented one position forward and the target position for the leader $M_1$ within queue zone $Q_1$ is reassigned to the end of the queue. Table 5 in FIG. 12 represents this movement. After the movement, mover $M_2$ is the new leader of the queue zone $Q_1$, and $M_3$ is its follower. Mover $M_4$ is still the leader of queue zone $Q_2$, and movers $M_5$. $M_6$, and $M_1$ are its followers. The result of these movements is represented by Table 6 in FIG. 12. The process can continue, and the movers move in a circular pattern in the queue zones $Q_1$ and $Q_2$. Since each cart knows it position within each queue, and nothing happens until the lead cart leaves the queue, resulting in the movement of the queues, the positioning of the carts does not result in collisions, and existing movement control techniques can be used.

The representation in FIG. 10 will now be discussed as an example. Each mover 25 has a defined location within each of the queue zones. Similar to the dual queue zone example of FIG. 9, discussed above, each mover is assigned to one of the locations in each of the four queue zones shown in FIG. 10. The initial positions assigned to each mover within each queue zone is shown in Table 7 of FIG. 13A. The use of bold in FIG. 13 represents the physical location of a mover. The use of hatching in FIG. 13 represents the possible target positions in each queue zone. Unlike the prior examples in which each queue zone included enough target positions to receive each of the movers in the system, queue zone 2 and queue zone 4 each have just three target positions while the system includes six movers. Nevertheless, each queue includes a target for each mover within the system. In one embodiment, the target position may be a predefined value that is not present in the queue. This case is illustrated in the queue for queue zone $Q_2$. Movers $M_1$, $M_2$, and $M_3$ are each assigned to target position X99, which doesn't exist within the system. In another embodiment, the target position for each mover that will not fit within a queue may be the last location within the queue. This case is illustrated in the queue for queue zone $Q_4$. Movers $M_1$, $M_2$, and $M_3$ are each assigned to target position X2, which is the last position with the queue. It is contemplated that various other values may be assigned to movers that do not fit within a queue, such as assigning sequentially increasing positions even if the positions do not exist.

While multiple movers may be assigned either to a non-existent position or to a duplicate position, collisions and/or erroneous move commands are avoided by the continuous rotation of movers through the target positions and because the system controller can only command each mover to be present at one target position within one of the queue zones at a time. Further, the system controller 125 maintains a status register for each queue zone, where one of the status flags indicates whether a queue zone is full. If a queue zone is full, a lead mover 25 located in the immediately prior queue zone will not be released for travel to the queue zone that is full. Only when the status flag indicates that at least one position is available in the next queue zone is a lead mover 25 from one queue zone given the command to move to its target position within the next queue zone. Once a position is available within the next queue zone, the queue manager will have assigned a valid target position to the lead mover 25 in the prior queue zone, such that no mover will ever receive a command to move to either a non-existent or to a duplicate target position.

With reference again to the example in FIG. 10, starting out, mover $M_1$ is at position $Q_1:X_0$, mover $M_2$ is at position $Q_1:X_1$, mover $M_3$ is at position $Q_3:X_0$, and movers $M_4$, $M_5$, and $M_6$, are at position $Q_2:X_0$, $Q_2:X_0$, and $Q_2:X_2$, respectively. Table 7 in FIG. 13A represents this configuration. Mover $M_1$ is the leader of queue zone $Q_1$, mover $M_4$ is the leader of queue zone $Q_2$, mover $M_3$ is the leader of queue zone $Q_3$. An action can occur while a mover is at position $Q_1X_0$, $Q_2X_0$, $Q_3X_0$, and/or $Q_4X_0$. Upon completion of the action, the system controller 125 may command a leader to leave the respective queue zone. This would be done by having the leader go towards a new target position. However, no target positions are available in queue zone $Q_2$ (i.e., the queue zone is full) as shown in the current arrangement. Accordingly, mover $M_1$ cannot leave queue zone $Q_1$ until room frees up in queue zone $Q_2$. This would be accomplished when mover $M_4$ leaves the queue zone $Q_2$ and moves towards $Q_3:X_1$. When mover $M_4$ leaves queue zone $Q_2$, it initiates an update of the target position for all movers in the system with respect to their target position in queue zone $Q_2$, and their corresponding target positions are all rotated one position forward. Table 8 in FIG. 13A represents this movement. Once mover $M_4$ has caused the queue manager to update the queue positions for queue zone $Q_2$, the queue manager indicates that there is a space available in queue zone $Q_2$ and mover $M_1$ is now allowed to enter queue zone $Q_2$. As also shown by Table 9 in FIG. 13B, the target position for mover $M_1$ within queue zone $Q_2$ has been updated to be a valid target position (i.e., position $X_2$). Thus, if mover $M_1$ has already received a command to move into zone 2 upon availability of space or if mover $M_1$ subsequently receives the command to move into zone 2, it now has a valid target position rather than the originally assigned place-holder target position. Table 10 of FIG. 13B next shows the movement of $M_1$ towards $Q_2:X_2$. When $M_1$ leaves queue zone $Q_1$, it initiates an update of the target positions for each mover within queue zone $Q_1$, shifting mover $M_2$ towards the leader position of queue zone $Q_1$. The result of these movements is represented by Table 11 in FIG. 13C. The process can continue with lead movers in each queue zone receiving a command to move to the next queue zone, updating the target positions for each mover within a queue zone, and causing the movers $M_1$ to $M_6$ move in a circular pattern through queue zones $Q_1$ to $Q_4$.

Figure 14:
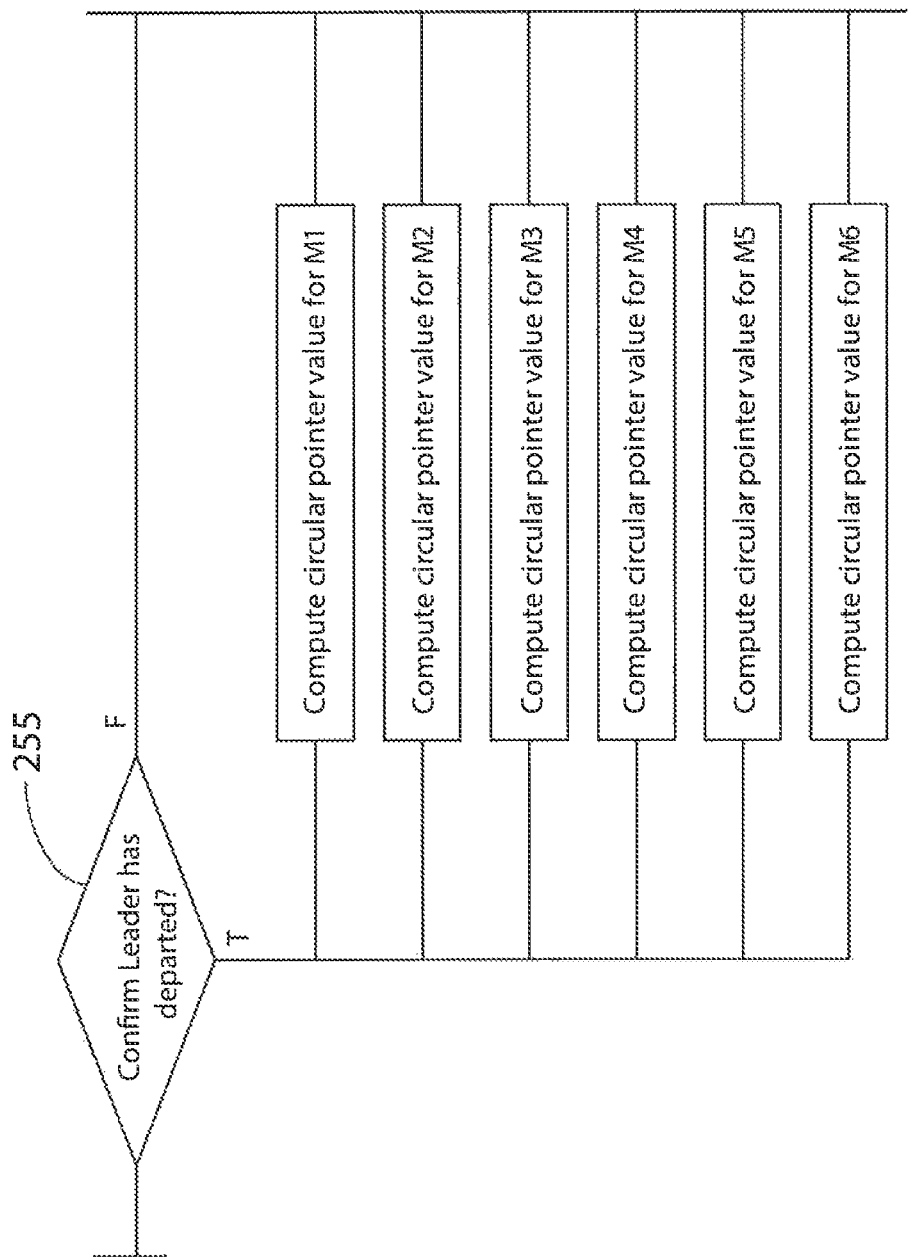
FIG. 14 is a modified ladder diagram representing a queue target pointer manager.

During operation, in various implementations, a queue target pointer manager (QTPM) is used to manage a zone pointer for each queue zone. That is, each queue zone $Q_1$ to $Q_N$ has a respective QTPM. FIG. 14 is a modified ladder diagram 260 representing an exemplary queue target pointer manager. For example purposes, the QTPM in FIG. 14 is the QTPM for queue zone $Q_2$ of the ICS of FIG. 10.

The ladder diagram 260 can be implemented by the system controller 125, for example. The system controller 125 executes instructions following the ladder diagram 260 when the leader, i.e., a mover at position $Q_2:X_0$ leaves the queue zone. For example, the ladder diagram can be implemented as mover $M_4$ leaves queue zone $Q_2$ as shown by Table 8 in FIG. 13A. At block 255, the system controller 125 confirms the leader of queue zone $Q_2$ has left. If true, the system controller 125 adjusts the pointer values of a circular pointer for each mover in the queue zone $Q_2$ by changing (e.g., decreasing) the pointer value by one. The pointer value for the lead mover leaving the queue zone is returned to the end position in the queue zone. The QTPM includes a respective computation block for each mover in the ICS. Table 12 of FIG. 15 represents a circular queue pointer for queue zone $Q_2$ at the point of Table 7 in FIG. 13A. Each mover $M_1$ to $M_6$ has a pointer value in the circular queue pointer. The system controller 125, based on the initial ICS setup, knows queue zone $Q_2$ has only 3 zone targets. Nevertheless, the queue pointer includes a slot for each mover in the system. The target position to which each pointer is directed will be assigned according to the particular embodiment. According to the one implementation, a valid position along the track are assigned to target positions zero, one, and two while an arbitrary position (e.g., position 99) is assigned to target positions three, four, and five.

As an initial step in the ICS setup, movers present within queue zone $Q_2$ are given the corresponding pointer location. The other movers are assigned to the arbitrary position. With the use of the QTPM, the system controller 125 maintains a record of what movers $M_1$ to $M_6$ are located in those 3 zone targets during operation. An example implementation of the system controller 125 accomplishing this will be discussed below in connection with FIG. 16. The system control 125 also knows where each mover $M_1$ to $M_0$ is within the various queue zones $Q_1$ to $Q_4$. Accordingly, as mover $M_4$ (in Table 8) leaves queue zone $Q_2$, the system controller 125, with the help of the QTPM for queue zone $Q_3$, moves mover $M_4$ towards zone target 1 of queue zone $Q_3$. Zone target 1 of queue zone $Q_3$ corresponds to target position $Q_3:X_1$. Table 13 of FIG. 15 represents the new values for the circular pointer for queue zone $Q_2$ at the point of Table 9 in FIG. 13B, where the pointer value corresponds to the target for each zone. The pointer value is used by each mover as an indirect reference to an array of absolute zone target positions on the closed loop track. As indicated, a valid absolute position is provided for each target position within a zone. When more movers are present in the system than target positions within a zone, pointer values for movers that are greater than the number of target positions within the zone could still be loaded with some value. This value may be a predefined and arbitrary value, indicative of a placeholder value or the value may be assigned to a valid position, such as the last valid target position in the zone. These arbitrary or duplicative values are cycled through the circular queue such they are never present as a target position for a mover, when the mover is assigned to enter the queue zone. Rather each mover will have a pointer value corresponding to one of the valid target positions within the queue zone.

Tables 14-19 provide examples of circular pointers alternative to Tables 12 and 13. Tables 14 and 15 illustrate a circular array which only includes pointers corresponding to zone targets within the zone. Rather than defining an arbitrary pointer value or reusing one of the valid zone target, three of the values of the circular pointer are left blank, or set to a null value, since the queue zone $Q_2$ only has 3 zone targets. Tables 16 and 17 illustrate a circular array which includes a predefined and/or an arbitrary value (e.g., 99) for movers which cannot fit within the queue zone. The circular array also includes pointers corresponding to zone targets for those movers that can fit within the queue zone. In this implementation, three of the values of the circular pointer have an arbitrary value (e.g., 99) since the queue zone $Q_2$ only has 3 zone targets and the other values in the circular pointer are directed to target positions zero, one, or two. Tables 18 and 19 are essentially identical to Tables 12 and 13, but the movers are the circular pointer.

Figure 16:
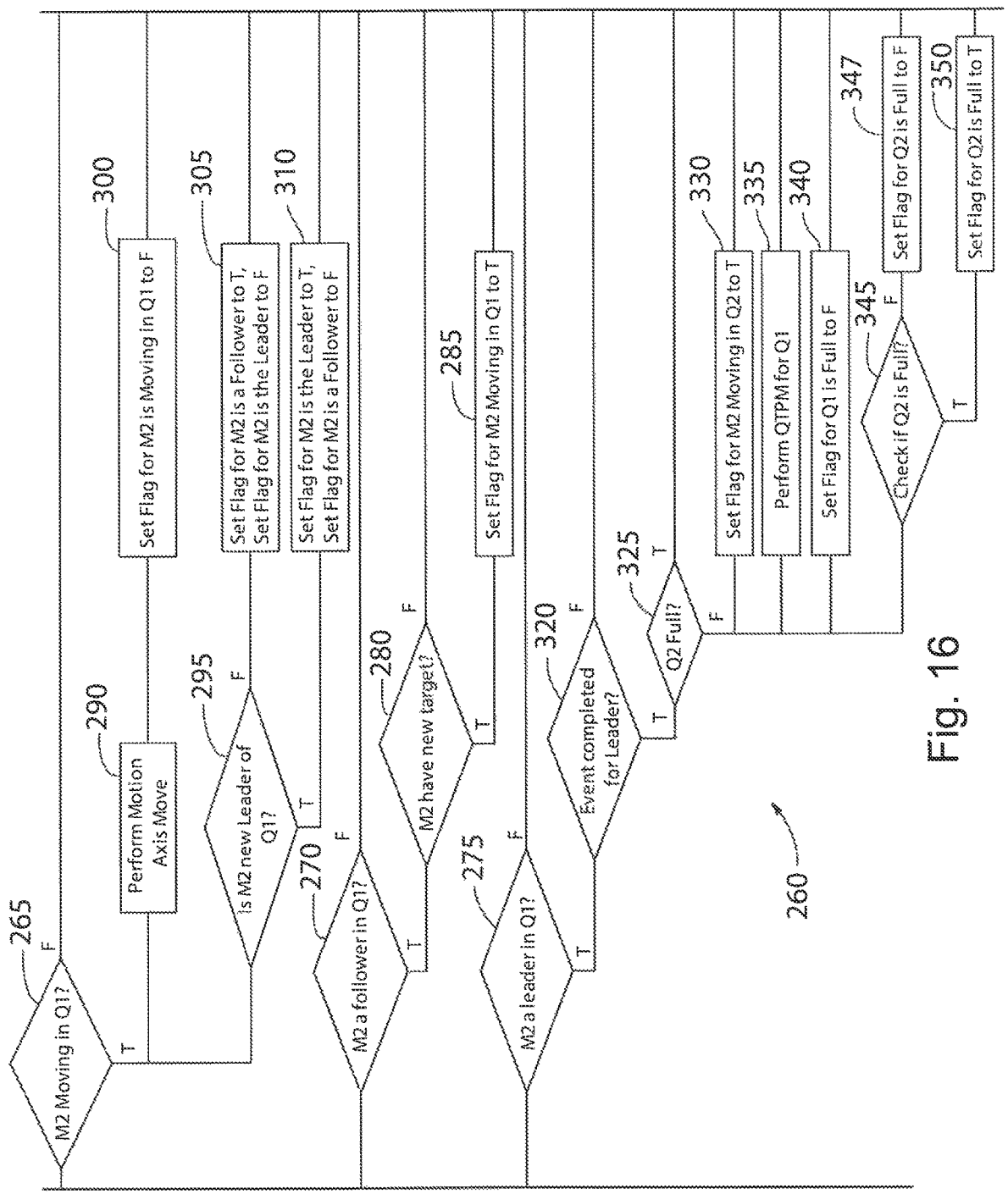
FIG. 16 is a modified ladder diagram representing control of a mover in a queue zone.

During operation, in various implementation, the system controller 125 also performs a series of mover motion modules (MMM). A modified ladder diagram 260 for one MMM is shown in FIG. 16. The modified ladder diagram 260 can be repeated for each mover and for each zone. Using the example in FIG. 10, the ladder diagram 260 is repeated for six movers and four zones, or twenty-four MMMs total. The ladder diagram 260 is representative of mover $M_2$ in queue zone $Q_1$.

Prior to initial operation, a technician programs the system controller 125 with the number of queue zones, design of the queue zones, number of targets, target positions, number of movers, movers, and initial mover locations, among other initial settings. Further, the technician defines what happens within a particular queue zone, and what actions result in the leader leaving a queue zone. Accordingly, prior to initial operation, the technician sets flags that mover $M_2$ is in queue zone $Q_1$, is a follower, and is at position $Q_1:X_1$, among other initial settings.

After initial commissioning, the locations of movers 25 within the system may be retained in non-volatile memory, such that the locations of each mover 25 is known to the system controller 125 upon power up. It is further contemplated that each mover 25 may have a unique identifier located on the mover 25. During power-up, the system controller 125 may read the unique identifier to determine the location of each mover 25 within the system. In still another implementation, a single mover may have a unique identifier, indicating, for example, that it is the first mover in the system. The system controller 125 may then determine the presence of each mover in the system and assign each mover an incrementally larger identifier along the length of the track. The system controller 125 uses the mover identification, along with the position information, queue zone identification, and the like established during commissioning to generate motion commands for each mover 25.

At blocks 265, 270, and 275, the system controller 125 determines whether mover $M_2$ is moving in queue zone $Q_1$, $M_2$ is a follower in queue zone $Q_1$, or is a leader in queue zone $Q_1$, respectively. If none of these true (e.g., mover $M_2$ is in a different queue zone), the system controller 125 would determine false for all three blocks and move to the next MMM for $M_2$ until the system controller 125 finds a true statement for mover $M_2$ (e.g., the MMM with $M_2$ being in queue zone $Q_3$). Alternately, the system controller 125 may cluster all of the MMM sequences for one queue zone together and transition to the MMM for $M_3$ within queue zone $Q_2$. When the system controller executes the MMM sequences for the queue zone in which mover $M_2$ is located, it will generate any move command for that mover as required. However, the MMM shown in FIG. 16 is the correct MMM when the mover $M_2$ is in queue zone $Q_2$ as shown in FIG. 10. More specifically, block 270 is true since mover $M_2$ is a follower in $Q_1$.

At block 280, the system controller 125 determines whether the mover $M_2$ has a new target position. If false, the system controller effectively repeats blocks 270 and 280 until the statement is true. The statement becomes true when mover $M_1$ leaves queue zone $Q_1$ towards queue zone $Q_2$ as shown in Table 10 of FIG. 13B. When block 280 is true, the system controller proceeds to block 285, which sets a flag that $M_2$ is required to move within queue zone $Q_1$ and resets the follower flag so that block 280 is repeated.

The next time through the ladder logic 260, the system controller 125 determines that mover $M_2$ is now required to move within queue zone $Q_1$. As a result block 265 returns a true value and execution of the MMM proceeds to blocks 290 and 295. The system controller issues a move command at block 290 to mover $M_2$ to move to its target position. Previously, its target position was set to target position $X_1$ within queue zone $Q_1$. As a result of mover $M_1$ exiting queue zone $Q_1$, the circular pointer for the zone has been updated and mover $M_2$ now has position $X_0$ within queue zone Q; as its new target position and is instructed to move to the new position. The mover $M_2$ is at a current position, $Q_1:X_1$, that is different from the target position, $Q_1:X_0$. Accordingly, the system controller 125, with the help of the segment controllers 200, generate the required current in the coils 105 proximate the magnets 40 on mover $M_2$ to control motion of the axis associated with mover $M_2$ from $Q_1:X_1$ to target position $Q_1:X_0$. One exemplary technique for accomplishing the move is discussed earlier in connection with FIGS. 1-7. During the move, the system controller 125 sets a flag indicating the mover is in motion. Once the move is complete, the system controller 125 resets the flag indicating the mover $M_2$ is in motion within $Q_1$, as shown in step 300.

In tandem with performing the move command for mover $M_2$, the MMM performs a check at block 295 whether mover $M_2$ is the new leader of queue zone $Q_1$. If the statement is false, the system controller 125 sets a flag that $M_2$ is a follower (block 305) for queue zone $Q_1$. If $M_2$ is a follower, the system controller 125 proceeds through blocks 270, 280, and 285 as discussed. However, at completion of the move of Table 10 to Table 11 in FIG. 13, the mover $M_2$ is the new leader of queue zone $Q_1$ and the system controller 125 sets a flag that mover $M_1$ is the leader (block 310) of queue zone $Q_1$.

The next time through the ladder logic 260, the system controller 125 determines that mover $M_2$ is now the leader and that block 275 is true. Execution of the MMM will proceed to block 320. At block 320, the system controller 320 determines whether an event for the leader, i.e., mover $M_1$, has completed such that the leader can move out of the queue zone, i.e., queue zone $Q_1$. If false, the system controller 125 effectively repeats blocks 275 and 320 until the statement is true. The action that is anticipated for the leader in the queue zone will vary according to application requirements. The mover may, for example, be carrying a container that is to be filled, receive a label, or the like. The system controller 125 may receive additional input signals indicating the event has completed or, alternately, the system controller 125 may execute a delay timer causing the mover to wait at the position for a sufficient time for the event to occur. When the action is complete on the leader, the system controller 125 sets a flag correspondingly, indicating that the leader may exit the queue zone and execution of the MMM proceeds to block 325.

At block 325, the system controller 320 determines whether a flag indicating that queue zone $Q_2$ is full. As previously discussed, the system controller 320 will not issue a move command for a mover into a subsequent zone until there is an available space and, therefore, the circular pointer is directed to a valid position for the motion. For the present example, mover $M_4$ had moved out of queue zone $Q_2$, but movers $M_5$ and $M_6$ advanced within the zone and mover $M_1$ entered the zone. Therefore, queue zone $Q_2$ is identified as being full. Accordingly, a flag will be set indicating queue zone $Q_2$ is full. If the flag is true, the system controller 125 effectively repeats blocks 275, 320, and 325 until the statement is false. For the present example, the statement will become false when mover $M_5$ exits queue zone $Q_2$ and mover $M_6$ and $M_1$ move forward in the queue zone $Q_2$. At this point the flag indicating queue zone $Q_2$ is full is reset and MMM for Mover $M_2$ in queue zone $Q_1$ knows that space is available in queue zone $Q_2$. When space is available in queue zone $Q_2$, the system controller 125 proceeds to blocks 330, 335, 340, and 345.

For block 330, the system controller 125 sets a flag that mover $M_2$ is moving in queue zone $Q_2$. More specifically, mover $M_2$ needs to move from current position $Q_1:Z_0$ to target position $Q_2:X_2$. This allows the MMM for mover $M_2$ in queue zone $Q_2$ to now generate a similar operation to block 290 for the mover $M_2$, but in the MMM for queue zone $Q_2$. Since mover $M_2$, which is the leader, is leaving queue zone $Q_1$, the system controller performs the QTPM for queue zone $Q_1$ as shown in block 335. This will result in the ladder logic for queue zone $Q_1$ and similar to that discussed in FIG. 14 for queue zone $Q_1$ to update the circular pointer for $Q_1$. Any followers in queue zone $Q_1$ will receive new move commands in a manner similar to that discussed above to move forward one zone target and target position in queue zone $Q_1$. Similarly, any movers that enter queue zone $Q_1$ know where to be positioned because of the circular pointer. With this method, the leader dictates the queue positions for the followers. Zone targets for the followers are only updated when the leader departs the zone.

At block 340, the system controller 125 resets the queue zone flag to not full, if set at full, since the leader is leaving queue zone $Q_1$. Also, the system controller 125 checks whether, with the inclusion of an additional follower, i.e., mover $M_2$, queue zone $Q_2$ is now full (block 345). If queue zone $Q_2$ is full, the system sets the queue zone $Q_2$ full flag as true (block 350). If queue zone $Q_2$ is not full, the system sets the queue zone $Q_2$ full flag as false (block 347).

Accordingly, collisions are avoided because the operation of the invention only considers the destination location for each mover 25, then only provides new destination information to all movers 25 once the leader in the queue has departed. All movers 25 are moved to their new locations nearly simultaneously with the use of the system controller 125/segment controller 200 motion capability. Management of the relative spacing between movers 25 is handled at a motion planner level. There is no need to have additional code for each mover 25 to monitor the location of its adjacent neighbor.

Further, code does not need to reside in the motion event task or a high-speed task. It can reside in a task with any update period. The technique of the invention is very efficient allowing for managing mover locations and speeds that even exceed the current capabilities of available ICT hardware. Also, the invention eliminates the "caterpillar effect" of movers 25 in their respective queue zones.

Moreover, the number of movers 25 allowed to enter any one queue zone is configurable and changeable on the fly. Queue zones can be bypassed on the fly by all movers or on an individual basis based on leader configuration. Machine rate (speed) for the queue zones can be changed on the fly without loss of mover synchronization.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A method of controlling operation of a plurality of movers traveling along a path of an automated independent cart system, the method comprising the steps of:
defining a queue zone for the path, the queue zone having one or more target positions, wherein one of the one or more target positions is a lead position;
defining a circular pointer for the queue zone;
associating the circular pointer with the one or more target positions of the queue zone;
associating at least ne of the plurality of movers with the one or more target positions in the circular pointer;
associating one of the plurality of movers with the lead position in the circular pointer, wherein the associated mover is a lead mover;

circulating the plurality of movers associated with the one or more target positions within the circular pointer when the lead mover leaves the queue zone; and moving the plurality of movers through the queue zone based on the circular pointer.

2. The method of claim 1, wherein the plurality of movers includes a number of movers, the number of movers being greater than zero, and wherein the circular pointer has a number of items, the number of items being equal to the number of movers.

3. The method of claim 1, wherein associating the circular pointer with the one or more target positions includes associating each of the plurality of movers with one of the one or more target positions.

4. The method of claim 3, wherein circulating the plurality of movers associated with the one or more target positions within the circular pointer includes circulating the one or more target positions with respect to each of the plurality of movers.

5. The method of claim 3, wherein associating the circular pointer with the one or more target positions includes an indirect association.

6. The method of claim 1, the method further comprising the steps of:
defining a second queue zone for the path, the second queue zone having one or more second target positions, wherein one of the one or more second target positions is a second lead position;
defining a second circular pointer for the second queue zone;
associating the second circular pointer with the one or more second target positions of the second queue zone;
associating at least one of the plurality of movers with the one or more second target positions in the second circular pointer;
associating a second one of the plurality of movers with the second lead position in the second circular pointer, wherein the second associated mover is a second lead mover;
circulating the plurality of movers associated with the one or more target positions within the second circular pointer when the second lead mover leaves the second queue zone; and
moving the plurality of movers through the second queue zone based on the second circular pointer.

7. The method of claim 6, wherein the plurality of movers includes a number of movers, the number of movers being greater than zero, wherein the circular pointer has a number of items, wherein the second circular pointer has a second number of items, and wherein the number of items and the second number of items are each equal to the number of movers.

8. The method of claim 1, wherein a first mover in the queue zone has a current position and a target position, wherein moving the plurality of movers includes moving the first mover to the target position when the current position and the target position are not the same.

9. The method of claim 8, wherein the method further comprises changing the target position of the first mover based on circulating the plurality of movers associated with the one or more target positions within the circular pointer.

10. A method of controlling operation of a plurality of movers traveling along a path of an automated independent cart system, the method comprising the steps of:
receiving a status flag at a system controller for the automated independent cart system corresponding to desired motion of a lead mover located within a first queue zone along the path;
determining whether one of the first queue zone and a second queue zone has a vacant space for the lead mover,
responsive to receiving the status flag and when the vacant space for the lead mover is present, reading an absolute position for the vacant position as a function of a circular pointer for the corresponding queue zone in which the vacant position is located;
generating a move command with the system controller for the lead mover to travel along the path to the vacant position;
when the lead mover exits the first queue zone, updating a target position for each additional mover located within the first queue zone; and
generating an additional mover command with the system controller for each additional mover located within the first queue zone to move to the updated target position.

11. The method of claim 10 wherein the automated independent cart system includes a plurality of queue zones along the path and a plurality of movers configured to travel along the path, further comprising an initial step of:
defining a circular pointer for each of the plurality of queue zones, wherein each circular pointer includes a value for each of the plurality of movers.

12. An automated independent cart system comprising:
a plurality of movers, each including at least one drive magnet;
a track including a plurality of track segments, each track segment of the plurality of track segments having, respectively, a plurality of drive coils and a drive coupled to the plurality of drive coils; and
a controller coupled to the track, the controller including a non-transitory storage medium configured to store a plurality of instructions and a processor in communication with the non-transitory storage medium, the processor being operative to execute the plurality of instruction to:
define a queue zone for the track, the queue zone having one or more target positions, wherein one of the one or more target positions is a lead position;
define a circular pointer for the queue zone;
associate the circular pointer with the one or more target positions of the queue zone;
associate at least one of the plurality of movers with the one or more target positions in the circular pointer;
associate one of the plurality of movers with the lead position in the circular pointer, wherein the associated mover is a lead mover;
circulate the plurality of movers associated with the one or more target positions within the circular pointer when the lead mover leaves the queue zone; and
control the drive coils to move the plurality of movers through the queue zone based on the circular pointer.

13. The automated independent cart system of claim 12, wherein a first mover in the queue zone has a current position and a target position, and wherein the processor is operative to move the plurality of movers through the queue zone by further executing the plurality of instructions to move the first mover to the target position when the current position and the target position are not the same.

14. The automated independent cart system of claim 12, wherein the processor is further operative to execute the plurality of instruction to define a second queue zone for the track, the second queue zone having one or more second target positions, wherein one of the one or more second target positions is a second lead position;

define a second circular pointer for the second queue zone;

associate the second circular pointer with the one or more second target positions of the second queue zone;

associate at least one of the plurality of movers with the one or more second target positions in the second circular pointer;

associate a second one of the plurality of movers with the second lead position in the second circular pointer, wherein the second associated mover is a second lead mover;

circulate the plurality of movers associated with the one or more target positions within the second circular pointer when the second lead mover leaves the second queue zone; and control the drive coils to move the plurality of movers through the second queue zone based on the second circular pointer.

15. The automated independent cart system of claim 12, wherein the plurality of movers includes a number of movers, the number of movers being greater than zero, wherein the circular pointer has a number of items, the number of items equal to the number of movers, and wherein the processor is operative to associate the circular pointer with the one or more target positions and with the the plurality of movers.

16. The automated independent cart system of claim 15, wherein the processor is operative to circulate the circular pointer by further executing the plurality of instructions to circulate the one or more target positions with respect to the each of the plurality of movers.

* * * * *